(12) United States Patent
Hattori et al.

(10) Patent No.: US 7,811,077 B2
(45) Date of Patent: Oct. 12, 2010

(54) STAMPER, IMPRINTING METHOD, AND METHOD OF MANUFACTURING AN INFORMATION RECORDING MEDIUM

(75) Inventors: Kazuhiro Hattori, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1009 days.

(21) Appl. No.: 11/536,846

(22) Filed: Sep. 29, 2006

(65) Prior Publication Data

US 2007/0120292 A1 May 31, 2007

(30) Foreign Application Priority Data

Nov. 25, 2005 (JP) ............... 2005-340418

(51) Int. Cl.
  *B29C 59/00* (2006.01)
  *B29D 17/00* (2006.01)
(52) U.S. Cl. .............. 425/385; 425/810; 264/1.33
(58) Field of Classification Search ............. 425/385, 425/810; 264/1.33; 101/28; *B29D 17/00*
   See application file for complete search history.

(56) References Cited

U.S. PATENT DOCUMENTS

| 5,772,905 | A | 6/1998 | Chou |
| 6,748,865 | B2 | 6/2004 | Sakurai et al. |
| 2005/0285308 | A1 | 12/2005 | Hattori et al. |

FOREIGN PATENT DOCUMENTS

| JP | 2003-100609 | 4/2003 |
| JP | 2003-157520 | 5/2003 |
| JP | 2005-293633 | 10/2005 |
| JP | 2005-353164 | 12/2005 |

OTHER PUBLICATIONS

Translation of JP2005-353164, Hattori, et al, Dec. 2005.*
English Language Abstract of JP 2003-157520.
English Language Abstract of JP 2003-100609.
English Language Abstract of JP 2005-353164.
U.S. Appl. No. 11/536,954 to Hattori et al., filed Sep. 29, 2006.
English language Abstract and computer-generated translation of JP 2005-293633.
English language computer-generated translation of JP 2003-157520.
English language computer-generated translation of JP 2003-100609.

* cited by examiner

*Primary Examiner*—Maria Veronica D Ewald
(74) *Attorney, Agent, or Firm*—Greenblum & Bernstein P.L.C.

(57) ABSTRACT

There is provided a stamper on which stamper-side concave/convex patterns are formed and which is capable of manufacturing an information recording medium on which at least servo patterns are formed by concave/convex patterns. First convex parts that are continuously formed along a direction corresponding to a radial direction of the information recording medium are formed in the stamper-side concave/convex patterns. Each of the first convex parts is formed so that a height of a part of the first convex part from a reference plane, which is set between a front surface and a rear surface of the stamper, to protruding end of the first convex part increases as a length of the part of the first convex part in a direction corresponding to a circumferential direction of the information recording medium increases.

14 Claims, 19 Drawing Sheets

FIG. 13
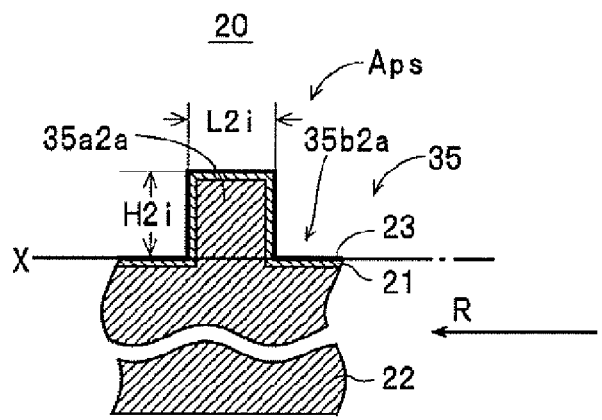
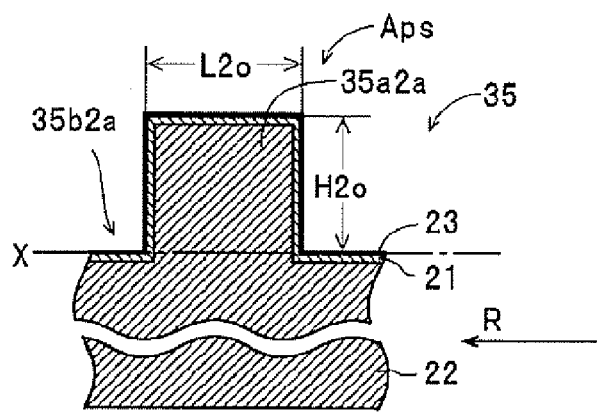
FIG. 14
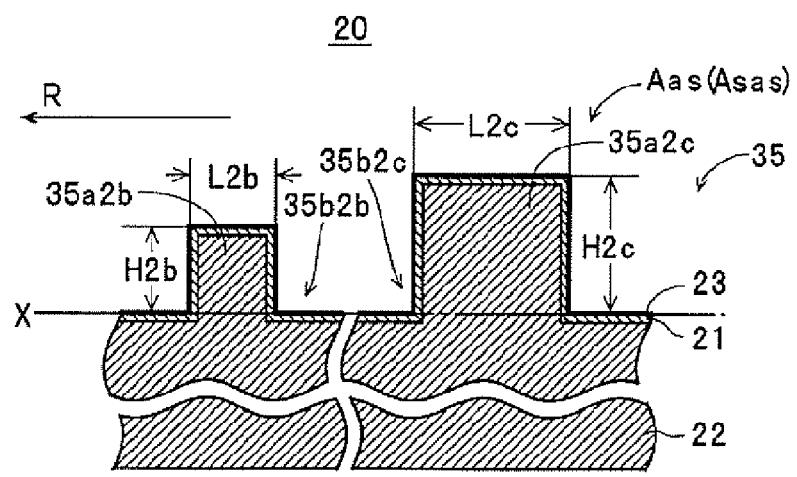

FIG. 15
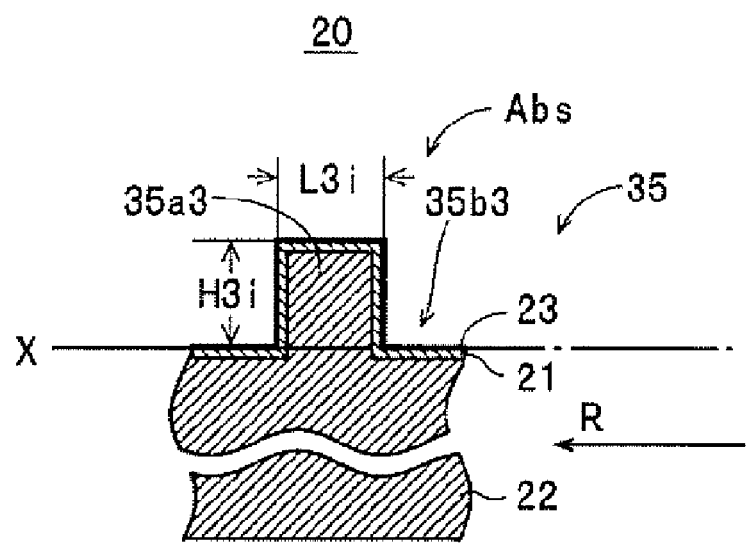
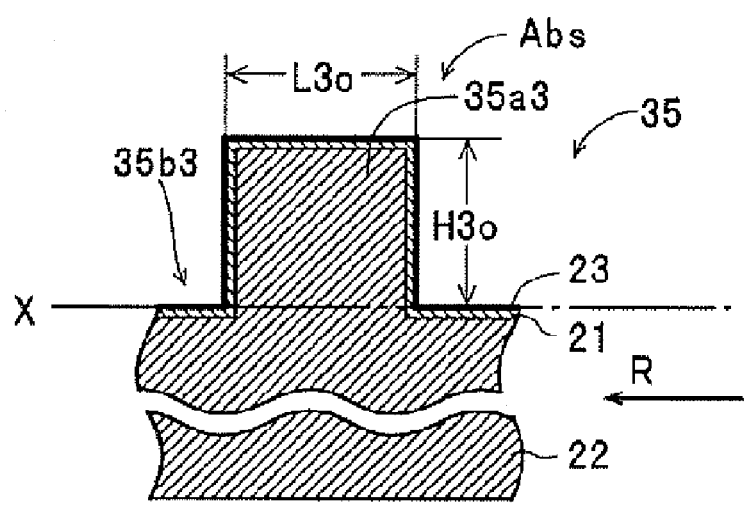

FIG. 16

|  | INNER PERIPHERY (DISTANCE FROM CENTER: 5.0mm) | | | OUTER PERIPHERY (DISTANCE FROM CENTER: 13.0mm) | | |
|---|---|---|---|---|---|---|
|  | LENGTH IN THE RADIAL DIRECTION | LENGTH IN THE CIRCUMFERENTIAL DIRECTION | HEIGHT | LENGTH IN THE RADIAL DIRECTION | LENGTH IN THE CIRCUMFERENTIAL DIRECTION | HEIGHT |
| DATA TRACK PATTERN CONVEX PARTS | 100nm | --- | 85nm | 100nm | --- | 85nm |
| PREAMBLE PATTERN CONVEX PARTS (TWO BITS LONG) | --- | 56nm | 80nm | --- | 147nm | 88nm |
| SECTOR ADDRESS PATTERN CONVEX PARTS (TWO BITS LONG) | --- | 56nm | 80nm | --- | 147nm | 88nm |
| SECTOR ADDRESS PATTERN CONVEX PARTS (EIGHT BITS LONG) | --- | 226nm | 90nm | --- | 587nm | 98nm |
| BURST PATTERN CONVEX PARTS | --- | 56nm | 92nm | --- | 147nm | 101nm |

FIG. 32

| | INNER PERIPHERY (DISTANCE FROM CENTER: 5.0mm) | | | OUTER PERIPHERY (DISTANCE FROM CENTER: 13.0mm) | | |
|---|---|---|---|---|---|---|
| | LENGTH IN THE RADIAL DIRECTION | LENGTH IN THE CIRCUMFERENTIAL DIRECTION | HEIGHT | LENGTH IN THE RADIAL DIRECTION | LENGTH IN THE CIRCUMFERENTIAL DIRECTION | HEIGHT |
| DATA TRACK PATTERN CONVEX PARTS | 100nm | ---- | 85nm | 100nm | ---- | 85nm |
| PREAMBLE PATTERN CONVEX PARTS (TWO BITS LONG) | ---- | 56nm | 80nm | ---- | 147nm | 88nm |
| SECTOR ADDRESS PATTERN CONVEX PARTS (TWO BITS LONG) | ---- | 56nm | 80nm | ---- | 147nm | 88nm |
| SECTOR ADDRESS PATTERN CONVEX PARTS (EIGHT BITS LONG) | ---- | 226nm | 90nm | ---- | 587nm | 98nm |
| BURST PATTERN CONVEX PARTS | 200nm | 56nm | 70nm | 200nm | 147nm | 82nm |

STAMPER, IMPRINTING METHOD, AND METHOD OF MANUFACTURING AN INFORMATION RECORDING MEDIUM

BACKGROUND OF THE INVENTION

1. Field of the Invention

The present invention relates to a stamper used when manufacturing an information recording medium, an imprinting method that presses a stamper into a resin layer formed on a surface of a substrate to transfer a concave/convex form of the stamper, and a method of manufacturing an information recording medium using a concave/convex pattern transferred to a resin layer.

2. Description of the Related Art

Optical lithography is conventionally known as a method of forming a fine concave/convex pattern (a resist pattern) in a resist layer (a resin layer) formed on a surface of a substrate during a process that manufactures an information recording medium or the like. When optical lithography is carried out, a resist layer formed on a substrate is irradiated with light to form an exposure pattern and then the resist layer is developed to form a concave/convex pattern on the substrate. In recent years, electron-beam lithography that draws a pattern of nanometer size using an electron beam instead of light to form a concave/convex pattern has been developed as a technique for forming an even finer pattern. However, electron-beam lithography has a problem in that a long time is required to draw a pattern on the resist layer, making such technique unsuited to mass production.

As a method of solving this problem, U.S. Pat. No. 5,772,905 discloses a nano-imprint lithography method (i.e., an imprinting method that forms a concave/convex pattern of nanometer size: hereinafter simply "imprinting method") that forms a concave/convex pattern of nanometer size on the substrate by pressing a stamper on which a concave/convex pattern of nanometer size has been formed onto a resin layer on a substrate to transfer the concave/convex form of the stamper to the resin layer. With this imprinting method, first as shown in FIG. 1A of U.S. Pat. No. 5,772,905, a stamper ("mold") 10z (hereinafter component elements disclosed in the specification of the USP are indicated by reference numerals appended with "z") that has a concave/convex pattern of nanometer size (as one example, with a minimum width of around 25 nm) formed in a transfer surface thereof is manufactured. More specifically, an electron beam lithography apparatus is used to draw a desired pattern on a resin layer formed so as to cover a thin film ("molding layer") 14z made of silicon oxide or the like that has been formed on the surface of a silicon substrate 12z, and then the thin film 14z is etched by a reactive ion etching apparatus with the resin layer as a mask to form a concave/convex pattern with a plurality of convex parts (features) 16z within the thickness of the thin film 14z. By doing so, the stamper 10z is manufactured.

Next, as one example, polymethyl methacrylate (PMMA) is spin coated on the surface of a silicon substrate 18z to form a resin layer (a "thin film layer") 20z with a thickness of around 55 nm. Next, after heating both the stamper 10z and a multilayer structure composed of the substrate 18z and the resin layer 20z to around 200° C., as shown in FIG. 1B of the U.S. Pat. No. 5,772,905, the convex parts 16z of the stamper 10z are pressed into the resin layer 20z on the substrate 18z with a pressure of 13.1 MPa (133.6 kgf/cm2). After this, the multilayer structure is left to cool to roam temperature in a state where the stamper 10z is still pressed in (i.e., a cooling process is carried out), and then the stamper 10z is separated from the resin layer 20z. By doing so, as shown in FIG. 1C of the U.S. Pat. No. 5,772,905, the convex parts 16z of the concave/convex pattern of the stamper 10z are transferred to the resin layer 20z to form a plurality of concave parts ("regions") 24z, thereby forming a concave/convex pattern of nanometer size (in the resin layer 20z) on the substrate 18z.

SUMMARY OF THE INVENTION

By investigating the conventional imprinting method described above, the present inventors found the following problems. That is, with this imprinting method, as shown in FIGS. 1A and 1B of the U.S. Pat. No. 5,772,905, a stamper 10z formed so that the heights from the bottom surfaces of the concave parts in the concave/convex pattern to the protruding ends of the convex parts 16z are uniform across the entire stamper (that is, a stamper formed so that the protruding ends of the respective convex parts 16z lie on substantially the same plane across the entire stamper 10z) is pressed into the resin layer 20z to form the concave/convex pattern on the substrate 18z. On an information recording medium manufactured in accordance with this type of imprinting method, servo signals used for tracking servo control are read from servo pattern regions with the medium being rotated at a constant angular velocity. Accordingly, the length in the circumferential direction (i.e., the direction of rotation) of the servo pattern regions on the information recording medium is set so as to gradually increase from the inner periphery to the outer periphery of the information recording medium. Also, as the length in the circumferential direction of the servo pattern regions increases toward the outer periphery, the lengths in the circumferential direction (i.e., the direction of rotation) of the convex parts and the concave parts that construct the servo patterns in the servo pattern regions are set so as to gradually increase from the inner periphery to the outer periphery. Accordingly, in servo pattern forming regions of the stamper 10z for manufacturing this type of information recording medium, the convex parts 16z are formed so that the length thereof along the direction corresponding to the circumferential direction of the information recording medium (hereinafter simply the "length in the circumferential direction") gradually increases from the inner periphery to the outer periphery. However, with the conventional imprinting method, since the concave/convex pattern is pressed onto the resin layer 20z with a substantially uniform pressing force across the entire stamper 10z, for example the outer peripheries of the convex parts 16z whose length in the circumferential direction is longer than the inner peripheries of the convex parts 16z are difficult to press sufficiently deeply into the resin layer 20z.

More specifically, in the preamble pattern regions of the servo pattern regions of the information recording medium, for example, convex parts and concave parts that are formed continuously in the radial direction and are therefore long in the radial direction are formed. Here, the convex parts and the concave parts in the preamble pattern regions are formed so that the lengths thereof in the circumferential direction gradually increase from the inner periphery to the outer periphery. Accordingly, in the preamble pattern forming regions of the stamper 10z for manufacturing the information recording medium, as one example, convex parts 16z whose length in a direction corresponding to the radial direction of the information recording medium (hereinafter simply the "length in the radial direction") is comparatively long and whose length in the circumferential direction gradually increases from the inner periphery to the outer periphery are formed as the convex parts for forming the concave parts described above on the information recording medium. Here, as shown in FIG, 35, in the inner peripheries of the preamble pattern forming regions where the length L11 in the circumferential direction of the convex parts 16z is comparatively short, the PMMA (the resin material forming the resin layer 20z) can smoothly move inside the concave parts in the periphery of the convex parts 16z when the convex parts 16z are pressed into the resin layer 20z, and therefore the convex parts 16z can be pressed sufficiently deeply into the resin layer 20z. As a result, in the inner peripheries of the preamble pattern forming regions, it is possible to form concave/convex patterns on the substrate 18z with a sufficiently small thickness T11 for the residue between the protruding ends of the convex parts 16z and the substrate 18z (i.e., at the bottoms of the concave parts 24z).

On the other hand, as shown in FIG. 36, in outer peripheries of the preamble pattern forming regions where the length L12 in the circumferential direction of the convex parts 16z are comparatively long, it is difficult for the PMMR to move smoothly inside the concave parts in the periphery of the convex parts 16z when the convex parts 16z are pressed into the resin layer 20z, and therefore it is difficult to press the convex parts 16z sufficiently deeply into the resin layer 20z. As a result, in the outer peripheries of the preamble pattern forming regions, it is difficult to make the thickness T12 of the residue between the protruding ends of the convex parts 16z and the substrate 18z sufficiently thin. Also, for the convex parts 16z for forming the burst patterns, where individual burst regions are composed of convex parts, out of the servo patterns of the information recording medium, for example, (i.e., convex parts 16z for forming concave parts between the individual burst regions of the burst patterns), the length in the circumferential direction between the concave parts that correspond to the individual burst regions is set so as to gradually increase from the inner periphery to the outer periphery. Accordingly, in the outer peripheries of the burst pattern forming regions where the length in the circumferential direction of the convex parts 16z is comparatively long, it is difficult for the PMMA to move smoothly inside the concave parts in the periphery of the convex parts 16z when the convex parts 16z are pressed into the resin layer 20, and therefore it is difficult to press the convex parts 16z sufficiently deeply into the resin layer 20z. As a result, in the outer peripheries of the burst pattern forming regions, it is difficult to make the thickness of the residue between the protruding ends of the convex parts 16z and the substrate 18z sufficiently thin.

On the other hand, in the address pattern regions of the information recording medium, convex parts that are formed continuously in the radial direction and therefore are long in the radial direction but have different lengths in the circumferential direction at positions with the same radius and concave parts present between the convex parts are formed (as example, sector address patterns where the length of the convex parts and concave parts in the circumferential direction is two bits and sector address patterns where the lengths of the convex parts and concave parts in the circumferential direction is eight bits). Accordingly, in the address pattern forming regions of the stamper 10z for manufacturing the information recording medium, a plurality of convex parts 16z that are comparatively long in the radial direction but have different lengths in the circumferential direction at positions with the same radius are formed as convex parts for forming the concave parts described above, for example. Note that the expression "two bits long" refers to a length in the circumferential direction that is recognized as a two-bit signal in an address pattern or the like at positions with the same radius. In the same way, the expression "eight bits long" refers to a length in the circumferential direction that is recognized as an eight-bit signal in an address pattern or the like at positions with the same radius. On a stamper 10z for forming burst patterns where the individual burst regions cut of the servo patterns on the information recording medium are composed of concave parts, the lengths in the circumferential direction of the convex parts 16z (i.e., convex parts 16z for forming the individual burst regions of the burst patterns) are set so that the convex parts 16z in the outer periphery become gradually longer than the convex parts 16z in the inner periphery.

Here, at positions where convex parts 16z for forming sector address patterns that are two bits long in the circumferential direction are formed, and at positions where convex parts 16z in the inner peripheries are formed out of the convex parts 16z corresponding to the individual burst regions described above, since the length in the circumferential direction of the convex parts 16z is comparatively short, the PMMA can move smoothly inside the concave parts in the periphery of the convex parts 16z when the convex parts 16z are pressed into the resin layer 20z. Accordingly, it is possible to press the convex parts 16z sufficiently deeply into the resin layer 20z. As a result, in the formation regions of the sector address patterns whose length in the circumferential direction is two bits long and in the inner peripheries of the burst pattern forming regions, it is possible to form concave/convex patterns on the substrate 18z with a sufficiently small thickness for the residue between the protruding ends of the convex parts 16z and the substrate 18z (i.e., at the bottoms of the concave parts 24z) is sufficiently thin can be formed on the substrate 18z. On the other hand, at positions where the convex parts 16z for forming the sector address patterns that are eight bits long in the circumferential direction are formed and at positions where the convex parts 16z in the outer peripheries are formed out of the convex parts 16z corresponding to the individual burst regions described above, the length in the circumferential direction of the convex parts 16z is comparatively long, making it difficult for the PMMA to move smoothly inside the concave parts in the periphery of the convex parts 16z when the convex parts 16z are pressed into the resin layer 20z. Accordingly, since it is difficult to press the convex parts 16z sufficiently deeply into the resin layer 20z, in the forming regions of the sector address patterns that are eight bits long in the circumferential direction and in the outer peripheries of the burst pattern forming regions, it is difficult to make the thickness of the residue between the protruding ends of the convex parts 16z and the substrate 18z (i.e., at the bottoms of the concave parts 24z) sufficiently thin.

When manufacturing an information recording medium using the concave/convex pattern formed on the substrate 18z, it is necessary to remove the residue from the substrate 18z at the bottoms of the concave parts 24z of the concave/convex pattern by carrying out an etching process or the like. Accordingly, when the concave/convex pattern has been formed on the substrate 18z by the conventional imprinting method, there is the problem that a long time is required to remove the thick residue at positions where the convex parts 16z with long lengths in the circumferential direction, for example, have been pressed in (in this example, the preamble patterns, the outer peripheries of the formation regions of the burst patterns and the sector address patterns that are two bits long in the circumferential direction, the entire ranges from the inner peripheries to the outer peripheries of the formation regions of the sector address patterns that are eight bits long in the circumferential direction, and the like). Also, as described above, the thickness of the residue at the positions where the convex parts 16z whose length in the radial direction is short, for example, (such as the inner peripheries of the preamble patterns, the sector address patterns that are two bits long in the circumferential direction, and the burst pattern forming regions) is sufficiently thinner than the thickness of the residue at the positions where the convex parts 16z that are long in the circumferential direction are pressed in. Accordingly, if the etching process is carried out for sufficient time to reliably remove the residue at the positions where the convex parts 16z whose length in the circumferential direction is long have been pressed in, before the removal of the residue at such positions is completed, the removal of the residue will be completed at the positions where the convex parts 16z whose length in the circumferential direction is short have been pressed in. As a result, at the positions where the convex parts 16z whose length in the circumferential direction is short have been pressed in (i.e., at the concave parts 24z whose length in the circumferential direction is short), the etching will continue until the removal of the residue at positions where the convex parts 16z whose length in the circumferential direction is long have been pressed in (i.e., at the concave parts 24z whose length in the circumferential direction is long), so that the inner side walls of the concave parts 24z are eroded, resulting in the length in the circumferential direction of the concave parts 24z (this length is hereinafter referred to as the "opening") becoming wider. This means that with the conventional imprinting method, there is another problem in that when a concave/convex pattern is formed on the substrate 18z, it is difficult to form the lengths (i.e., openings) of the concave parts 24z after the residue is removed (i.e., after the etching process) with the desired widths.

The present invention was conceived in view of the problems described above and it is a principal object of the present invention to provide a stamper, an imprinting method, and a method of manufacturing an information recording medium that can precisely form concave/convex patterns including concave parts with desired opening widths.

A stamper according to the present invention has stamper-side concave/convex patterns formed thereupon and is capable of manufacturing an information recording medium on which at least servo patterns are formed by concave/convex patterns, wherein first convex parts that are continuously formed along a direction corresponding to a radial direction of the information recording medium are formed in the stamper-side concave/convex patterns, and each of the first convex parts is formed so that a height of a part of the first convex part from a reference plane, which is set between a front surface and a rear surface of the stamper, to protruding end of the first convex part increases as a length of the part of the first convex part in a direction corresponding to a circumferential direction of the information recording medium increases. Note that the expression "the front surface of the stamper" in this specification refers to "bottom surfaces of concave parts in the stamper-side concave/convex patterns", that is, the "formation surface of the stamper-side concave/convex patterns". Here, when the bottom surfaces of the concave parts in the stamper-side concave/convex patterns do not lie on the same plane, a bottom surface of any of the concave parts (as one example, a bottom surface that is closest to the rear surface of the stamper out of the bottom surfaces of the concave parts) is set as the "front surface of the stamper" for the present invention. In addition, the expression "between the front surface and the rear surface" for the present invention includes both the "front surface of the stamper" and the "rear surface of the stamper". The expression "reference plane" in this specification refers to a freely chosen plane set between the front surface and the rear surface of the stamper. Note that the expression "the length (of the convex parts) in the direction corresponding to the circumferential direction" in this specification refers to "the distance in the circumferential direction between opposite side wall surfaces of one convex part".

According to the stamper according to the present invention and an imprinting method described later that uses such stamper, by forming each of the first convex part so that the height of a part of the first convex part from the reference plane to the protruding end increases as the length in the circumferential direction of the part of the first convex part increases, when the stamper is pressed onto the resin layer with a uniform pressing force across the entire stamper during imprinting, outer peripheries of the first convex parts and the like that are difficult to press into the resin layer can be pressed sufficiently deeply into the resin layer. Since the first convex parts in the servo pattern forming regions of the stamper can be pressed sufficiently deeply and to a similar extent into the resin layer in the entire range from the inner peripheries to the outer peripheries of the servo pattern forming regions, the thickness of the residue on the substrate can be made uniform in the servo pattern forming regions. Since the time required to remove the residue can be made substantially equal across the entire range of the servo pattern forming regions, it is possible to avoid a situation where the concave parts in the concave/convex patterns transferred to the resin layer in the inner peripheries of the servo pattern forming regions, for example, are formed with unintentionally wide openings due to the side wall surfaces of the concave parts being eroded. By doing so, a concave/convex pattern with concave parts of the desired opening widths can be precisely formed across the entire range from the inner peripheries to the outer peripheries of the servo pattern forming regions.

Another stamper according to the present invention has stamper-side concave/convex patterns formed thereupon and is capable of manufacturing an information recording medium on which at least servo patterns are formed by concave/convex patterns, wherein a plurality of first convex parts that are continuously formed along a direction corresponding to a radial direction of the information recording medium are formed in the stamper-side concave/convex patterns, and at positions with an equal radius from a center of the stamper, the first convex parts are formed so that a height thereof from a reference plane, which is set between a front surface and a rear surface of the stamper, to protruding ends of the first convex parts increases as a length of the first convex parts in a direction corresponding to a circumferential direction of the information recording medium increases.

According to the above stamper according to the present invention and an imprinting method described later that uses such stamper, by forming the first convex parts so that at positions with the same radius, the height of the first convex parts from the reference plane to the protruding ends increases as the length in the circumferential direction of the first convex parts increases, when the stamper is pressed onto the resin layer with a uniform pressing force across the entire stamper during imprinting, the first convex parts that are long in the circumferential direction and are difficult to press into the resin layer due to such length in the circumferential direction can be pressed sufficiently deeply into the resin layer and to a similar depth as the convex parts whose length in the circumferential direction is short. Since the convex parts in the servo pattern forming regions of the stamper can be pressed sufficiently deeply and to a similar extent into the resin layer, the thickness of the residue on the substrate can be made uniform in the servo pattern forming regions. Accordingly, since the time required to remove the residue can be made substantially equal across the entire range of the servo pattern forming regions, it is possible to avoid a situation where for example out of the concave parts in the concave/convex patterns transferred to the resin layer in the servo pattern forming regions, concave parts whose lengths in the circumferential direction (i.e., whose openings) are short are formed with unintentionally wide openings due to the side wall surfaces of the concave parts being eroded. By doing so, concave/convex patterns with concave parts of the desired opening widths can be precisely formed across the entire range of the servo pattern forming regions.

On the stamper according to the present invention, the stamper-side concave/convex patterns may be formed so as to be capable of manufacturing an information recording medium on which data track patterns and the servo patterns are formed by concave/convex patterns, and the first convex parts may be formed so that at positions where a length of the first convex parts in the direction corresponding to the circumferential direction is longer than a length in the direction corresponding to the radial direction of a second convex part that has the highest height out of convex parts formed in regions corresponding to the data track patterns, the height of the first convex parts is higher than the height of the second convex part. Note that the expression "the length (of the convex parts) in the direction corresponding to the radial direction" in this specification refers to "the distance in the radial direction between opposite side wall surfaces of one convex part".

According to the above stamper according to the present invention and an imprinting method described later that uses such stamper, the first convex parts are formed so that the height thereof is higher than the height of the second convex part at positions where the length in the circumferential direction of the first convex parts is longer than the length in the radial direction of the second convex part that has the highest height out of the convex parts formed in regions corresponding to the data track patterns. By doing so, when the stamper is pressed into the resin layer with a uniform pressing force across the entire stamper (the data track pattern forming regions and the servo pattern forming regions) during imprinting, first convex parts whose length in the circumferential direction in the outer periphery is longer than the length in the radial direction of the second convex parts for forming the data track patterns (for example, convex parts for forming the preamble patterns and convex parts for forming the sector address patterns) and first convex parts whose length in the circumferential direction is longer than the length in the radial direction of the second convex part for forming the data track patterns (for example, convex parts that are long in the circumferential direction cut of the convex parts for forming the sector address patterns) can be pressed into the resin layer sufficiently deeply and to a similar extent as the second convex part for forming the data track patterns. This means it is possible to make the thickness of the residue in the data track pattern forming regions and the thickness of the residue in the servo pattern forming regions substantially uniform. Since the time required to remove the residue can be made substantially equal across the entire resin layer, it is possible to avoid a situation where the concave parts in the concave/convex patterns transferred to the resin layer are formed with unintentionally wide openings due to the side wall surfaces of the concave parts being eroded. By doing so, concave/convex patterns with concave parts of the desired opening widths can be precisely formed across both the data track pattern regions and the servo pattern regions.

Another stamper according to the present invention has stamper-side concave/convex patterns formed thereupon and is capable of manufacturing an information recording medium on which at least servo patterns are formed by concave/convex patterns, wherein in the stamper-side concave/convex patterns, parts corresponding to individual burst regions in burst patterns out of the servo patterns are composed of concave parts and third convex parts are formed around the concave parts, and between the concave parts, each of the third convex parts is formed so that a height of a part of the third convex part from a reference plane, which is set between a front surface and a rear surface of the stamper, to protruding end of the third convex part increases as a length of the part of the third convex part in a direction corresponding to a circumferential direction of the information recording medium increases. Note that the expression "individual burst regions" in this specification refers to a plurality of convex parts or a plurality of concave parts that are parallelogram-shaped or substantially oval (which includes circular forms) and are disposed in the circumferential direction of the information recording medium.

According to the stamper according to the present invention and an imprinting method described later that uses such stamper, by forming, between the concave parts, each of the third convex parts so that the height of a part of the third convex part from the reference plane to the protruding end increases as the length of the part of the third convex part in the circumferential direction corresponding to the individual burst regions increases, when the stamper is pressed onto the resin layer with a uniform pressing force across the entire stamper during imprinting, the outer peripheries of the third convex parts that are difficult to press into the resin layer can be pressed sufficiently deeply into the resin layer. Since the third convex parts in the burst pattern forming regions of the stamper can be pressed sufficiently deeply into the resin layer and to a similar extent across the entire range from the inner peripheries to the outer peripheries of the burst pattern forming regions, the thickness of the residue on the substrate can be made uniform in the burst pattern forming regions. Since the time required to remove the residue can be made substantially equal across the entire range of the burst pattern forming regions, it is possible to avoid a situation where concave parts in the concave/convex patterns transferred to the resin layer in the burst pattern forming regions are formed with unintentionally wide openings due to the side wall surfaces of the concave parts being eroded. By doing so, concave/convex patterns with concave parts of the desired opening widths can be precisely formed across the entire range from the inner peripheries to the outer peripheries of the regions corresponding to the burst pattern regions.

Another stamper according to the present invention has stamper-side concave/convex patterns formed thereupon and is capable of manufacturing an information recording medium on which at least servo patterns are formed by concave/convex patterns, wherein in the stamper-side concave/convex patterns, parts corresponding to individual burst regions in burst patterns out of the servo patterns are composed of fourth convex parts, and the fourth convex parts are formed so that a height thereof from a reference plane, which is set between a front surface and a rear surface of the stamper, to protruding ends of the fourth convex parts increases as a length of the fourth convex parts in a direction corresponding to a circumferential direction of the information recording medium increases.

According to the stamper according to the present invention and an imprinting method described later that uses such stamper, by forming the fourth convex parts corresponding to the individual burst regions so that the height from the reference plane to the protruding ends increases as the length in the circumferential direction of the fourth convex parts increases, when the stamper is pressed onto the resin layer with a uniform pressing force across the entire stamper during imprinting, it is possible to press the fourth convex parts that are difficult to press into the resin layer due to their long length in the circumferential direction sufficiently deeply into the resin layer. Since the fourth convex parts can be pressed sufficiently deeply and to a similar extent into the resin layer in the entire range from the inner peripheries to the outer peripheries of the burst pattern forming regions, the thickness of the residue on the substrate can be made uniform in the burst pattern forming region. Accordingly, since the time required to remove the residue can be made substantially equal across the entire range of the burst pattern forming regions, it is possible to avoid a situation where the concave parts in the concave/convex patterns transferred to the resin layer in the burst pattern forming regions are formed with unintentionally wide openings due to the side wall surfaces of the concave parts being eroded. By doing so, concave/convex patterns with concave parts of the desired opening widths can be precisely formed across the entire range from the inner peripheries to the outer peripheries of the regions corresponding to the burst pattern regions.

An imprinting method according to the present invention comprises a stamper pressing process, which presses the stamper-side concave/convex patterns of any of the stampers described above onto a resin layer formed by applying a resin material onto a surface of a substrate, and a stamper separating process, which separates the stamper from the resin layer, wherein the stamper pressing process and the stamper separating process are carried out in the mentioned order to transfer a concave/convex form of the stamper-side concave/convex patterns to the resin layer.

A method of manufacturing an information recording medium according to the present invention uses a concave/convex pattern transferred to the resin layer by the imprinting method described above.

According to the method of manufacturing an information recording medium according to the present invention, by manufacturing the information recording medium using the concave/convex pattern transferred to the resin layer by the imprinting method described above, it is possible to form servo patterns in the servo pattern regions using a precise concave/convex pattern in which concave parts of the desired opening widths have been formed in the entire range from the inner periphery to the outer periphery of each region corresponding to the servo pattern regions, for example. By doing so, it is possible to precisely form the servo patterns inside the servo pattern regions. Accordingly it is possible to provide an information recording medium from which servo signals can be reliably obtained, so that a magnetic head can be properly kept on a desired data recording track, thereby making it possible to properly record data on data recording tracks and to properly read data from the data recording tracks.

It should be noted that the disclosure of the present invention relates to a content of Japanese Patent Application 2005-340418 that was filed on 25 Nov. 2005 and the entire content of which is herein incorporated by reference.

BRIEF DESCRIPTION OF THE DRAWINGS

These and other objects and features of the present invention will be explained in more detail below with reference to the attached drawings, wherein:

FIG. 13 is a cross-sectional view along the circumferential direction of the inner periphery and the outer periphery of a preamble pattern forming region of the stamper;

FIG. 14 is a cross-sectional view along the circumferential direction of a sector address pattern forming region of the stamper;

FIG. 15 is a cross-sectional view along the circumferential direction of the inner periphery and the outer periphery of a burst pattern forming region of the stamper;

FIG. 16 is a correspondence chart showing the relationship between the lengths of convex parts of the stamper and the height from a reference plane to the protruding ends of the convex parts;

FIG. 32 is a correspondence chart showing the relationship between the lengths of the convex parts of the stamper and the height from a reference plane to the protruding ends of the convex parts;

DESCRIPTION OF THE PREFERRED EMBODIMENTS

Preferred embodiments of a stamper, an imprinting method, and a method of manufacturing an information recording medium according to the present invention will now be described with reference to the attached drawings.

First, the construction of an imprinting apparatus 100 for manufacturing an information recording medium using the stamper according to the present invention will be described with reference to the drawings.

Figure 1:
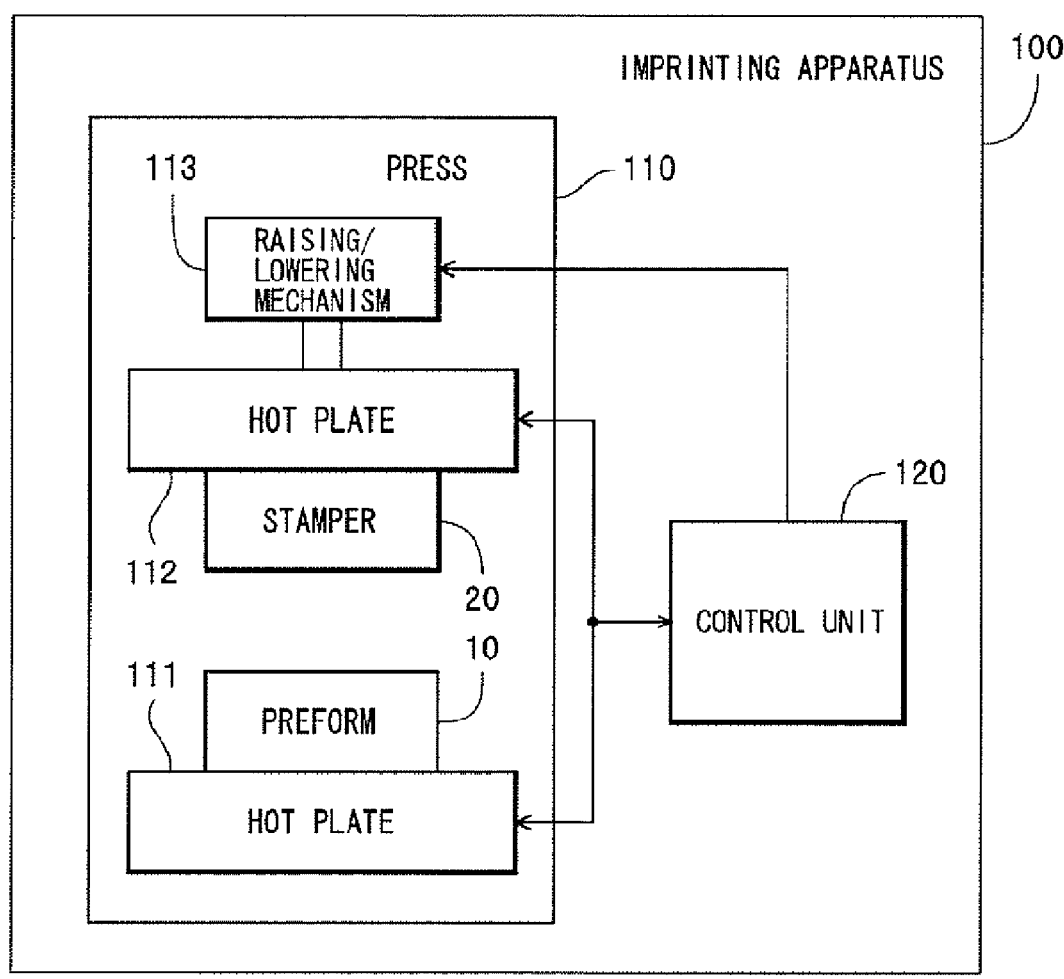
FIG. 1 is a block diagram showing the construction of an imprinting apparatus.
Figure 2:
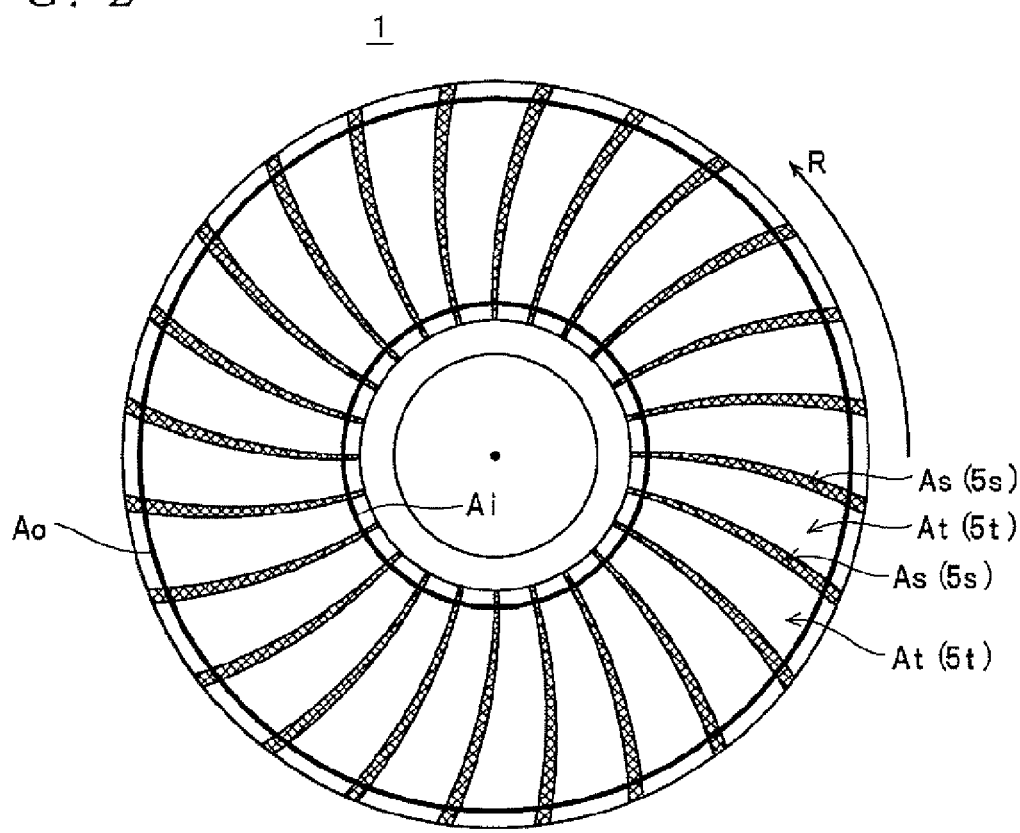
FIG. 2 is a plan view of an information recording medium.
Figure 3:
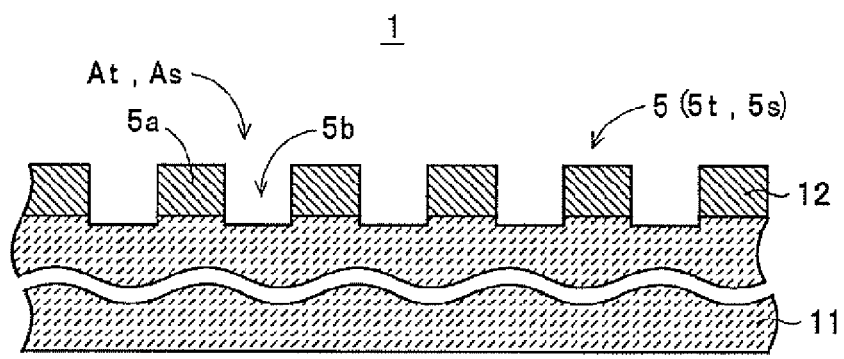
FIG. 3 is a cross-sectional view of the information recording medium.

The imprinting apparatus 100 shown in FIG. 1 includes a press 110 and a control unit 120 and is constructed so as to be capable of forming a concave/convex pattern 36 (see FIG. 23) by pressing a stamper 20 (see FIG. 5) onto a preform 10 (see FIG. 4) when manufacturing the information recording medium 1 shown in FIGS. 2 and 3 in accordance with the imprinting method according to the present invention. The information recording medium 1 is a discrete-track type magnetic recording medium and as shown in FIG. 2, servo pattern regions As are provided between data track pattern regions At so that the data track pattern regions At and the servo pattern regions As are alternately disposed in the direction of rotation (the "circumferential direction", shown by the arrow R in FIG. 2) of the information recording medium 1. Also, as shown in FIG. 3, in each data track pattern region At, a data track pattern composed of a large number of concentric data recording tracks, which are produced by dividing the region with a predetermined arrangement pitch, and guard band parts is formed by concave/convex patterns 5 (concave/convex patterns 5t) including a plurality of convex parts 5a and a plurality of concave parts 5b. Similarly, in each servo pattern region As, various types of servo patterns for tracking servo control are formed by concave/convex patterns 5 (concave/convex patterns 5s) including a plurality of convex parts 5a and a plurality of concave parts 5b. Note that in FIGS. 3 and 5, for ease of understanding the present invention, the lengths of the convex parts and the concave parts have been shown differently to the actual lengths. In this specification, a region sandwiched by two data track pattern regions At that are disposed in the direction of rotation (i.e., a region from a downstream end in the direction of rotation of one data track pattern region At to an upstream end in the direction of rotation of another data track pattern region At) is referred to as a "servo pattern region As".

Figure 4:
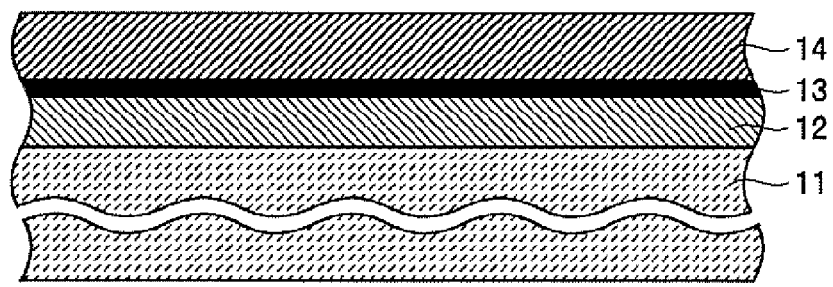
FIG. 4 is a cross-sectional view of a preform.

Also, as shown in FIG. 4, as one example the preform 10 is constructed by laminating (forming) a magnetic layer 12, a metal layer 13, and a resin layer 14 in the mentioned order on a disk-shaped base plate 11 formed in a circular-plate shape from alumina, silicon, glass, ceramic, or the like. In reality, various functional layers such as a soft magnetic layer and an oriented layer are provided between the disk-shaped base plate 11 and the magnetic layer 12, but for ease of understanding the present invention, such layers have been omitted from the description and drawings. It should be noted that in this example, the disk-shaped base plate 11, the magnetic layer 12 and the metal layer 13 together construct the "substrate" for the present invention. As examples, polystyrene resin, methacrylate resin (such as PMMA), polystyrene, phenol resin, novolac resin, and the like should preferably be used as the resin material that forms the resin layer 14 since a favorable concave/convex form is achieved for the concave/convex pattern 36 formed when the stamper 20 is separated as described later. For the preform 10 described here, as one example, the resin layer 14 is formed using novolac resin so that the thickness of the resin layer 14 is in a range of 40 nm to 100 nm, inclusive (as one example, 70 nm).

Figure 5:
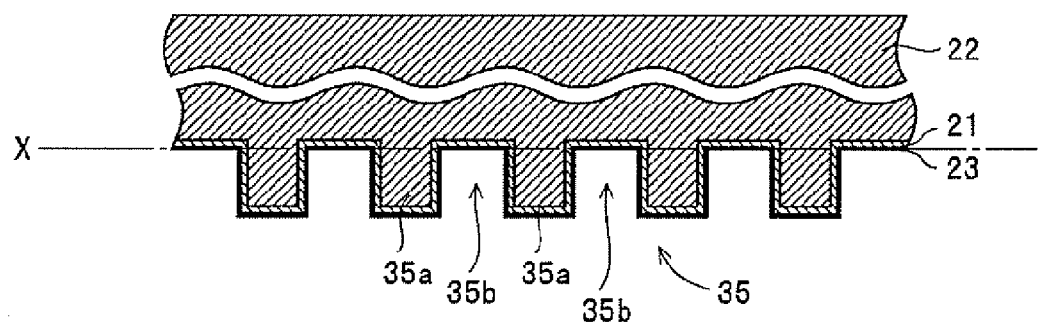
FIG. 5 is a cross-sectional view of a stamper.

On the other hand, as shown in FIG. 5, the stamper (mold) 20 is formed in a circular-plate shape with a thickness of around 300 μm by laminating an electrode film 21 and a nickel layer 22. The rear surface of the stamper 20 (the upper surface in FIG. 5) is formed so as to be flat and concave/convex patterns 35 (one example of the "stamper-side concave/convex patterns" for the present invention) for forming the concave/convex pattern 36 in the resin layer 14 of the preform 10 are formed on the front surface of the stamper 20 (i.e., the surface that forms the bottom surfaces of the concave parts 35b in the concave/convex pattern 35: the lower surface in FIG. 5). In addition, as described later, to prevent the resin material from adhering to the stamper 20 when the stamper 20 is separated from the resin layer 14, an adhesive force reducing film 23 is formed by coating the surface of the electrode film 21 (the surface of the concave/convex patterns 35) with a fluorochemical material, for example. In this case, the material that forms the adhesive force reducing film 23 is not limited to a fluorochemical coating material, and any material that can reduce adhesion to the resin layer 14 may be used. The concave/convex patterns 35 of the stamper 20 include convex parts 35a formed corresponding to the concave parts 5b of the concave/convex patterns 5 (the concave/convex patterns 5t, 5s) of the information recording medium 1 and concave parts 35b formed corresponding to the convex parts 5a of the concave/convex patterns 5.

Figure 6:
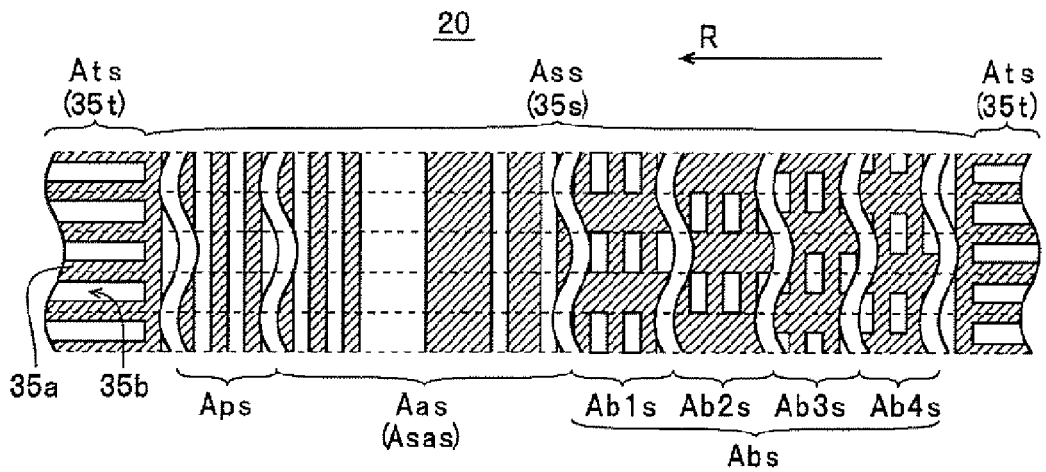
FIG. 6 is a plan view of data track pattern forming regions and a servo pattern forming region of the stamper.

More specifically, as shown in FIG. 6, on the stamper 20, data track pattern forming regions Ats, in which the concave/convex patterns 35t for forming the concave/convex patterns 5t (data track patterns) in the data track pattern regions At of the information recording medium 1 are formed, and servo pattern forming regions Ass, in which the concave/convex patterns 35s for forming the concave/convex patterns 5s (servo patterns) in the servo pattern regions As of the information recording medium 1 are formed, are set corresponding to the data track pattern regions At and the servo pattern regions As of the information recording medium 1. Note that in FIG. 6 and in FIGS. 7 to 10 and 31, 33, and 34 described later, the formation positions of the convex parts 35*a* have been obliquely shaded. A preamble pattern forming region Aps in which a concave/convex pattern 35*s* for forming a preamble pattern is formed, an address pattern forming region Aas in which a concave/convex pattern 35*s* for forming an address pattern is formed, and a burst pattern forming region Abs in which a concave/convex pattern 35*s* for forming a burst pattern is formed are set in each servo pattern forming region Ass. In addition, a sector address pattern forming region Asas in which a concave/convex pattern 35*s* for forming a sector address pattern is formed is set in each address pattern forming region Aas, and four regions Ab1*s* to Ab4*s* corresponding to signal regions of burst patterns on the information recording medium 1 are set in each burst pattern forming region Abs. Note that although regions for forming various address patterns aside from the sector address pattern forming regions Asas are set in each address pattern forming region Aas, for ease of understanding the present invention, regions aside from the sector address pattern forming regions Asas are omitted from this description and the drawings.

Figure 7:
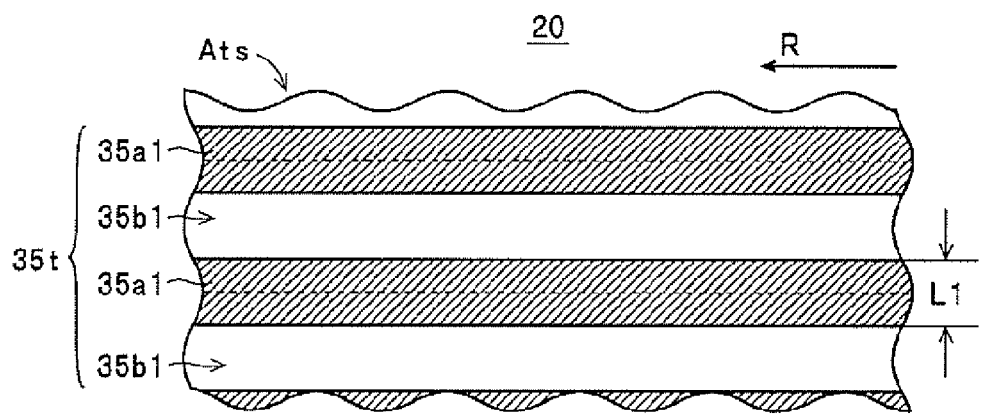
FIG. 7 is a plan view of a data track pattern forming region of the stamper.

Here, the convex parts 35*a* formed in the data track pattern forming regions Ats and the convex parts 35*a* formed in the servo pattern forming regions Ass have lengths (hereinafter, "lengths in the radial direction") in a direction corresponding to the radial direction of the information recording medium 1 (hereinafter, a direction for the stamper 20 that corresponds to the radial direction of the information recording medium 1 is also referred to as the "radial direction") and lengths (hereinafter, "lengths in the circumferential direction") in a direction corresponding to the circumferential direction (i.e., direction of rotation) of the information recording medium 1 (hereinafter, a direction for the stamper 20 that corresponds to the circumferential direction of the information recording medium 1 is also referred to as the "circumferential direction") set in accordance with the forms of the data track patterns and servo patterns of the information recording medium 1. More specifically, as shown in FIG. 7, the convex parts 35*a*1 formed in the data track pattern forming regions Ats are convex parts for forming the guard band parts (inter-track concave parts) of the data track patterns of the information recording medium 1 and are continuously formed along a direction corresponding to the circumferential direction (i.e., the direction of rotation: the direction shown by the arrow R in FIG. 7) of the information recording medium 1 as long belt-like shapes elongated in the circumferential direction. These convex parts 35*a*1 are one example of "second convex parts" for the present invention and have lengths in the circumferential direction that are set corresponding to the lengths along the circumferential direction of the data track pattern regions At of the information recording medium 1. Also, as shown in FIG. 16, the convex parts 35*a*1 (the "data track pattern convex parts" in FIG. 16) are formed so that the length thereof in the radial direction (the length L1 shown in FIG. 7) is 100 nm, for example, across the entire range from the region corresponding to an inner periphery Ai of the information recording medium 1 to a region corresponding to an outer periphery Ao. Note that the concave parts 35*b*1 shown in FIG. 7 are concave parts for forming the convex parts 5*a* used as the data recording tracks on the information recording medium 1, and as one example are formed so that the length thereof in the radial direction is substantially equal to the length L1 in the radial direction of the convex parts 35*a*1.

Figure 8:
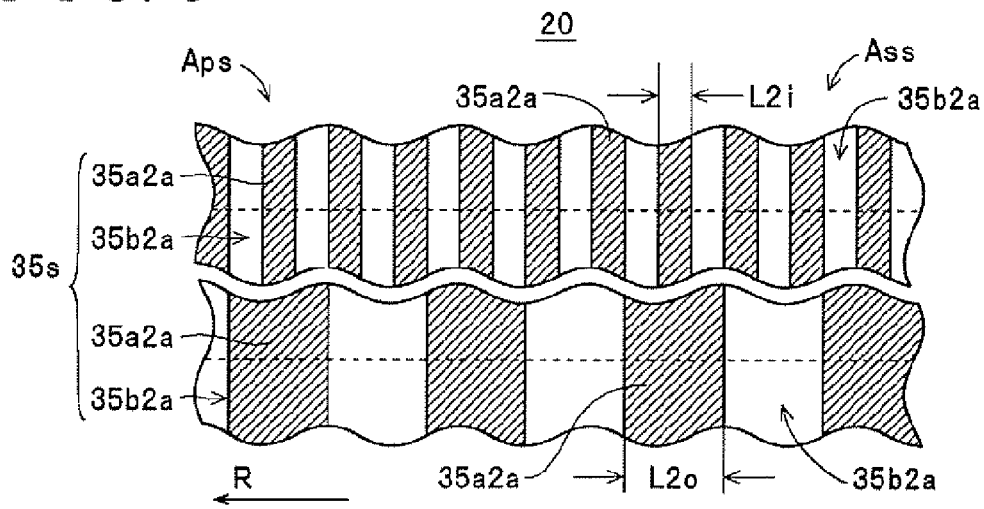
FIG. 8 is a plan view of a preamble pattern forming region inside a servo pattern forming region of the stamper.

Also, as shown in FIG. 8, the convex parts 35*a*2 formed in the preamble pattern forming region Aps in each servo pattern forming region Ass are convex parts for forming the concave parts 5*b* used as a preamble pattern on the information recording medium 1 and are continuously formed along a direction corresponding to the radial direction of the information recording medium 1 as long belt-like shapes elongated in the radial direction. The convex parts 35*a*2 are one example of "first convex parts" for the present invention and are formed so that the length thereof in the radial direction corresponds to the length from the inner periphery Ai to the outer periphery Ao of the information recording medium 1. Also, as shown in FIGS. 8 and 16, the convex parts 35*a*2 (indicated as "preamble pattern convex parts (length=two bits)" in FIG. 16) are set so that the length thereof in the circumferential direction gradually increases from the inner periphery to the outer periphery, so that in a region corresponding to the inner periphery Ai of the information recording medium 1 (at a position 5.0 mm from the center, for example), the length in the circumferential direction (the length L2*i* shown in FIG. 8) is 56 nm, for example, and in a region corresponding to the outer periphery Ao of the information recording medium 1 (at a position 13.0 mm from the center, for example), the length in the circumferential direction (the length L2*o* shown in FIG. 8) is 147 nm, for example. Note that the concave parts 35*b*2*a* shown in FIG. 8 are concave parts for forming the convex parts 5*a* used as preamble patterns on the information recording medium 1 and as one example are formed with the length thereof in the circumferential direction set substantially equal to the length in the circumferential direction of the convex parts 35*a*2*a* at positions with the same radius.

Figure 9:
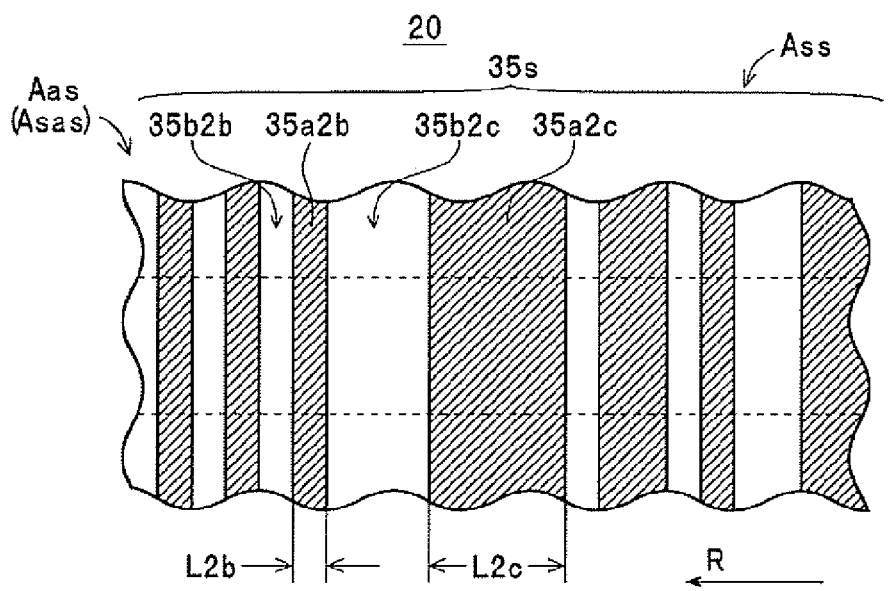
FIG. 9 is a plan view of a sector address pattern forming region inside a servo pattern forming region on the stamper.

In addition, as shown in FIG. 9, the convex parts 35*a*2*b*, 35*a*2*c* formed in a sector address pattern forming region Asas of an address pattern forming region Aas in each servo pattern forming region Ass are convex parts for forming the concave parts 5*b* used as sector address patterns of the information recording medium 1, and in the sane way as the convex parts 35*a*2 for forming the concave parts 5*b* used as the preamble patterns described earlier, are continuously formed along the direction corresponding to the radial direction of the information recording medium 1 as long belt-like shapes elongated in the radial direction. The convex parts 35*a*2*b*, 35*a*2*c* are other examples of "first convex parts" for the present invention, the lengths thereof in the radial direction are set corresponding to the length from the inner periphery Ai to the outer periphery Ao of the information recording medium 1, and the lengths thereof in the circumferential direction are set so as to gradually increase from the inner periphery to the outer periphery. More specifically, as shown in FIG. 9 and in FIG. 16, the convex parts 35*a*2*b* that are two bits long in the circumferential direction are formed so that the length L2*b* thereof in the circumferential direction is 56 nm, for example, in regions corresponding to the inner periphery Ai of the information recording medium 1 and the length L2*b* thereof in the circumferential direction is 147 nm, for example, in regions corresponding to the outer periphery Ao of the information recording medium 1. On the other hand, the convex parts 35*a*2*c* that are eight bits long in the circumferential direction are formed so that the length L2*c* thereof in the circumferential direction is 226 nm, for example, in regions corresponding to the inner periphery Ai of the information recording medium 1 and the length L2*c* thereof in the circumferential direction is 587 nm, for example, in regions corresponding to the outer periphery Ao of the information recording medium 1. Note that the concave parts 35*b*2*b*, 35*b*2*c* that are formed in the sector address pattern forming regions Asas are concave parts for forming the convex parts 5*a* for the sector address patterns of the information recording medium 1, and as one example are formed so that the lengths thereof are two bits long, eight bits long and the like in the same way as the lengths L2b, L2c in the circumferential direction of the convex parts 35a2b, 35a2c for forming the sector address patterns.

Figure 10:
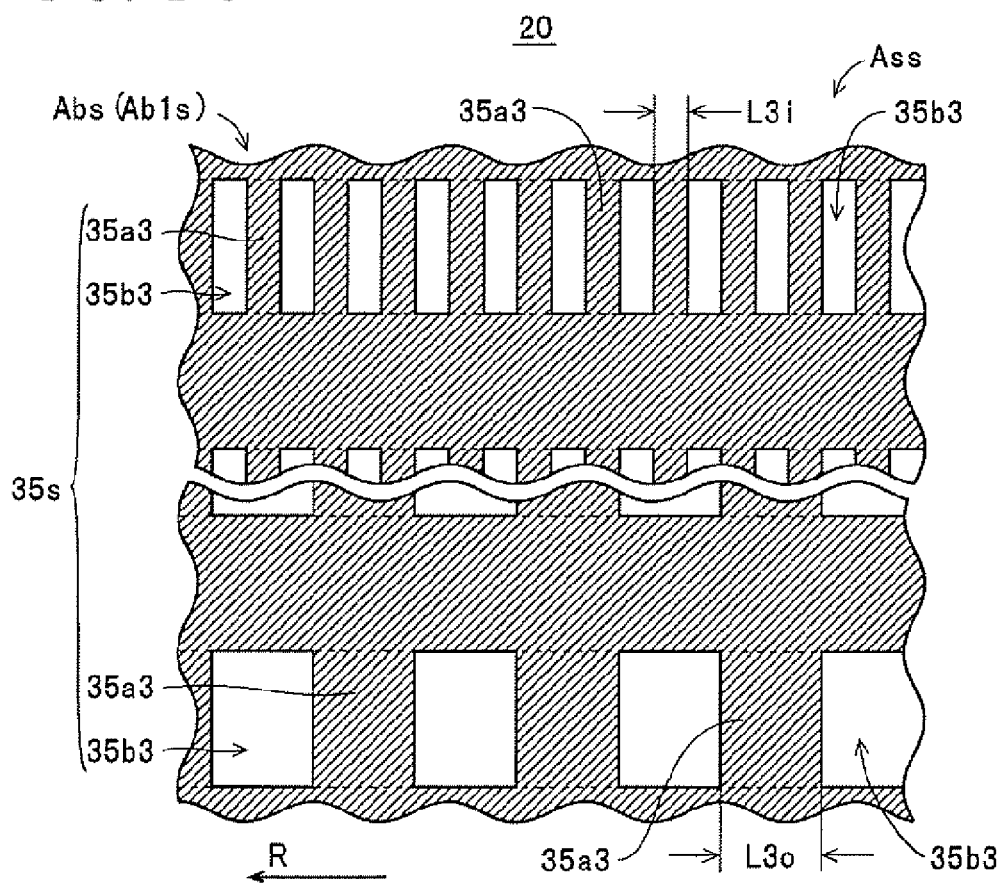
FIG. 10 is a plan view of a burst pattern forming region inside a servo pattern forming region of the stamper.

Also, as shown in FIG. 10, the convex parts 35a3 formed in the burst pattern forming regions Abs (as one example, the region Ab1s) of the servo pattern forming regions Ass are examples of "third convex parts" for the present invention, and are constructed so as to be capable of forming the concave parts 5b of the burst patterns of the information recording medium 1. Here, in the burst pattern forming regions Abs of the stamper 20, as one example, a plurality of concave parts 35b3, which are parallelogram-shaped when viewed from above and can manufacture an information recording medium 1 including burst patterns where the individual burst regions are composed of convex parts, are formed at positions corresponding to the individual burst regions. Also, as one example, the convex parts 35a3 are formed as a single convex part in each burst pattern forming region Abs so as to surround a plurality of concave parts 35b3 in the regions Ab1s to Ab4s. In addition, as shown in FIG. 16, the length in the circumferential direction of the convex parts 35a3 between two concave parts 35b3 that are adjacent in the circumferential direction inside the regions Ab1s to Ab4s (i.e., the length of the "burst pattern convex parts" in FIG. 16) is set so as to gradually increase from the inner periphery to the outer periphery. More specifically, the convex parts 35a3 are formed so that the length thereof in the circumferential direction (the length L3i shown in FIG. 10) is 56 nm in a region corresponding to the inner periphery Ai of the information recording medium 1 and the length thereof in the circumferential direction (the length L3o shown in FIG. 10) is 147 nm in a region corresponding to the outer periphery Ao of the information recording medium 1. Note that as one example, the length in the circumferential direction of the concave parts 35b3 is set substantially equal to the length in the circumferential direction of the convex parts 35a3 between two concave parts 35b3 at positions with the same radius.

Figure 11:
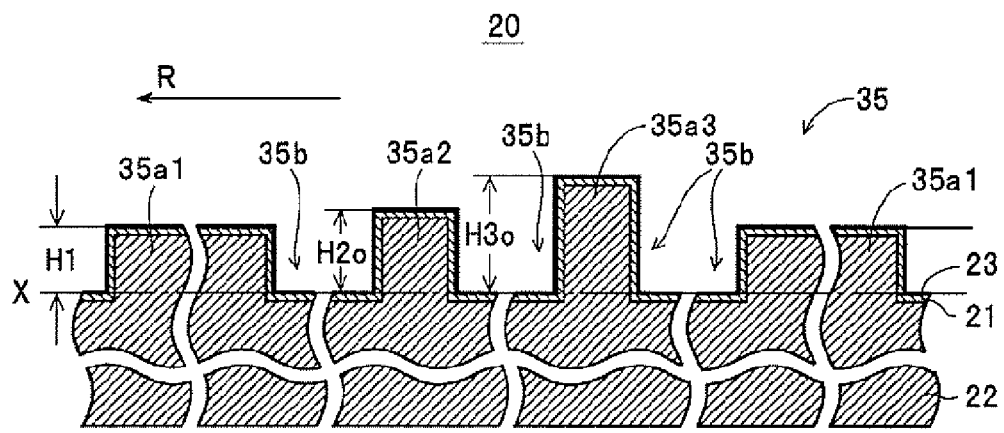
FIG. 11 is a cross-sectional view in the circumferential direction of a stamper where bottom surfaces of concave parts lie on the same plane.
Figure 12:
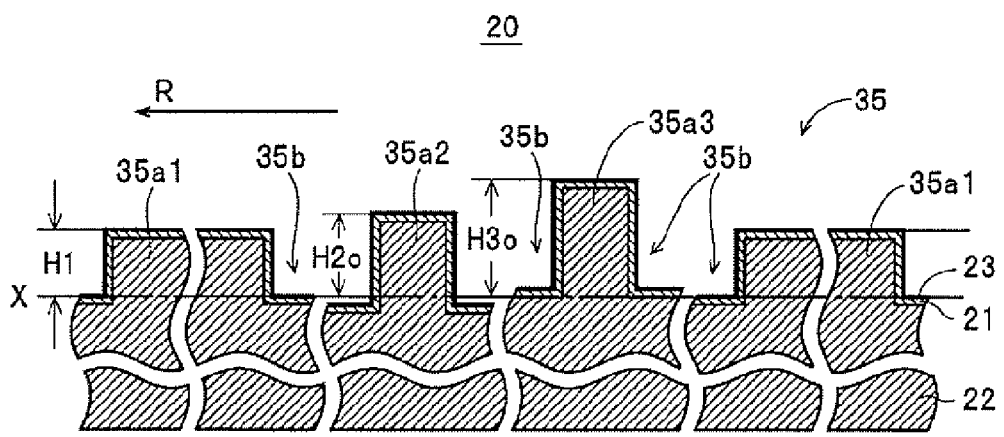
FIG. 12 is a cross-sectional view in the circumferential direction of a stamper where bottom surfaces of concave parts do not lie on the same plane.

Also, as shown in FIG. 11, on the stamper 20, the bottom surfaces of the concave parts 35b between the convex parts 35a that construct the concave/convex patterns 35 are formed so as to lie on substantially the same plane as the concave/convex pattern formation surface (the "front surface" for the present invention) of the stamper 20. Note that in this specification the bottom surfaces of the concave parts 35b (that is, the concave/convex pattern formation surface) are referred to in the following description as a "reference plane" (a reference plane X) for the present invention. The "reference plane" for the present invention is not limited to the reference plane X whose position matches the bottom surfaces of the concave parts 35b (i.e., a plane that includes the bottom surfaces), and any chosen position between the rear surface of the stamper and the concave/convex pattern formation surface (that is, any position in a range of the thickness of the stamper) can be set as the reference plane X. Also, as shown in FIG. 12, according to this method of manufacturing, in some cases the bottom surfaces of the respective concave parts 35b do not lie on the same plane, and in this case a plane including the bottom surface of any of the concave parts 35b (in the example in FIG. 12, the concave parts 35b formed on both sides of the convex part 35a1) can be set as the reference plane X. Also, as shown in FIG. 11, the convex parts 35a in the concave/convex patterns 35 are formed so that the respective heights from the reference plane X to the protruding ends of the respective convex parts are set in accordance with the respective lengths in the radial direction and the lengths in the circumferential direction of the convex parts.

More specifically, as shown in FIG. 16, the convex parts 35a1 for forming the data track patterns whose length L1 in the radial direction is 100 nm in the entire range from the inner periphery to the outer periphery are formed so that the height from the reference plane X to the protruding ends of the convex parts 35a1 (that is, the height H1 shown in FIGS. 11 and 12: the protruding length of the convex parts 35a1) is 85 nm in the entire range from the inner periphery to the outer periphery. The convex parts 35a2a for forming the preamble patterns whose length L2i in the circumferential direction in the inner periphery is 56 nm and whose length L2o in the circumferential direction in the outer periphery is 147 nm are formed so that the height from the reference plane X to the protruding ends of the convex parts 35a2a (that is, the protruding length of the convex parts 35a2a) gradually increases from the inner periphery to the outer periphery. In this example, as shown in FIGS. 13 and 16, the convex parts 35a2a are formed with a height H2i in the inner periphery of 80 nm and a height H2o in the outer periphery of 88 nm. In this way, on the stamper 20, the convex parts 35a2a that are continuously formed along the radial direction are formed so that the height from the reference plane X to the protruding ends of the convex parts 35a2a is higher than the height H1 of the convex parts 35a1 at positions where the length of the convex parts 35a2a in the circumferential direction is longer than the length L1 in the radial direction of the convex parts 35a1 formed in the data track pattern forming regions Ats.

In addition, the convex parts 35a2b for forming the (two bits long) sector address patterns whose length in the circumferential direction is 56 nm in the inner periphery and is 147 nm in the outer periphery are formed so that the height thereof (the height H2b shown in FIG. 14: the protruding length of the convex parts 35a2b) from the reference plane X to the protruding ends of the convex parts 35a2b gradually increases from the inner periphery to the outer periphery. Here, as shown in FIG. 16, the height H2b of the convex parts 35a2b is set so as to be 80 nm in the inner periphery and at 88 nm in the outer periphery. In the same way, the convex parts 35a2c for forming the (eight bits long) sector address patterns whose length in the circumferential direction is 226 nm in the inner periphery and is 587 nm in the outer periphery are formed so that the height thereof (the height H2c shown in FIG. 14: the protruding length of the convex parts 35a2c) from the reference plane X to the protruding ends of the convex parts 35a2c gradually increases from the inner periphery to the outer periphery. In this case, as shown in FIG. 16, the height H2c of the convex parts 35a2c is set at 90 nm in the inner periphery and at 98 nm in the outer periphery. In this way, on the stamper 20, as shown in FIG. 14, the convex parts 35a formed in the sector address pattern forming regions Asas, for example, are formed so that the height H2c of the convex parts 35a2c whose length L2c in the circumferential direction at positions with the same radius is long is higher than the height H2b of the convex parts 35a2b whose length L2b in the circumferential direction at positions with the same radius is short.

The convex parts 35a3 for forming the burst patterns whose length L3i in the inner periphery between two concave parts 35b3 that are adjacent in the circumferential direction is 56 nm and whose length L3o in the outer periphery is 147 nm are formed so that the height from the reference plane X between two concave parts 35b3 to the protruding ends (that is, the protruding length of the convex parts 35a3 between the concave parts 35b3) increases toward the outer periphery. Here, as shown in FIGS. 15 and 16, the convex parts 35a3 are formed so that the height H3*i* between the concave parts 35*b*3 in the inner periphery is 92 nm and the height H3*o* between the concave parts 35*b*3 in the outer periphery is 101 nm. In this way, on the stamper 20, the convex parts 35*a*3 formed continuously in both the radial direction and the circumferential direction to surround a plurality of concave parts 35*b*3 are formed so that the height thereof from the reference plane X to the protruding ends of the convex parts 35*a*3 is higher than the height H1 of the convex parts 35*a*1 across the entire stamper and so that the height of the convex parts 35*a*3 between concave parts 35*b*3 that are adjacent in the circumferential direction gradually increases from the inner periphery to the outer periphery. Note that the difference between the largest and smallest heights of the convex parts 35*a* formed in the various regions described above should preferably be 50 nm or below so that the convex parts 35*a* can be reliably pressed into the resin layer 14 as described later.

Figure 24:
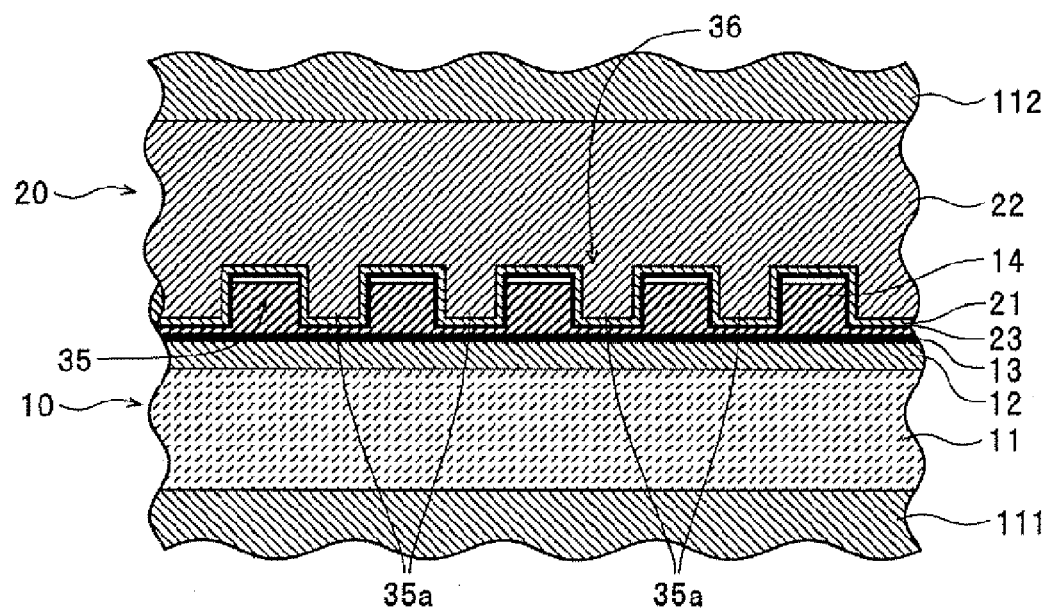
FIG. 24 is a cross-sectional view of a state where the stamper has been pressed onto a resin layer of the preform.

On the other hand, as shown in FIG. 1, the press 110 includes hot plates 111, 112 and a raising/lowering mechanism 113. The hot plates 111, 112 heat the preform 10 and the stamper 20 under the control of the control unit 120. Also, as shown in FIG. 24, the hot plate 111 is constructed so as to be capable of holding the preform 10 in a state where the surface on which the resin layer 14 has been formed faces upward, and the hot plate 112 is constructed so as to be capable of holding the stamper 20 in a state where the formation surface of the concave/convex patterns 35 faces downward. The raising/lowering mechanism 113 moves (lowers) the hot plate 112 toward the preform 10 held by the hot plate 111 to press the stamper 20 held by the hot plate 112 into the resin layer 14 of the preform 10. Also, the raising/lowering mechanism 113 separates (raises) the hot plate 112 from the hot plate 111 to separate the stamper 20 pressed into the resin layer 14 from the resin layer 14. The control unit 120 controls the hot plates 111, 112 to heat both the preform 10 and the stamper 20 and controls the raising/lowering mechanism 113 to press the stamper 20 onto the preform 10 (the "stamper pressing process" for the present invention) and to separate the stamper 20 pressed into the preform 10 from the preform 10 (the "stamper separating process" for the present invention).

Next, the method of manufacturing the stamper 20 will be described with reference to the drawings.

Figure 17:
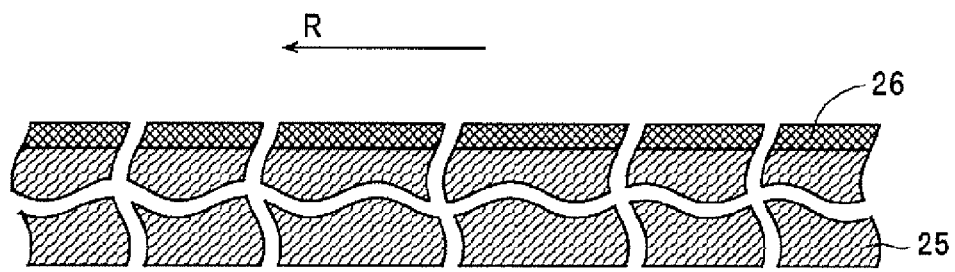
FIG. 17 is a cross-sectional view along the circumferential direction of a disk-shaped base plate in a state where a nickel layer has been formed on a surface in the manufacturing process of a stamper.
Figure 18:
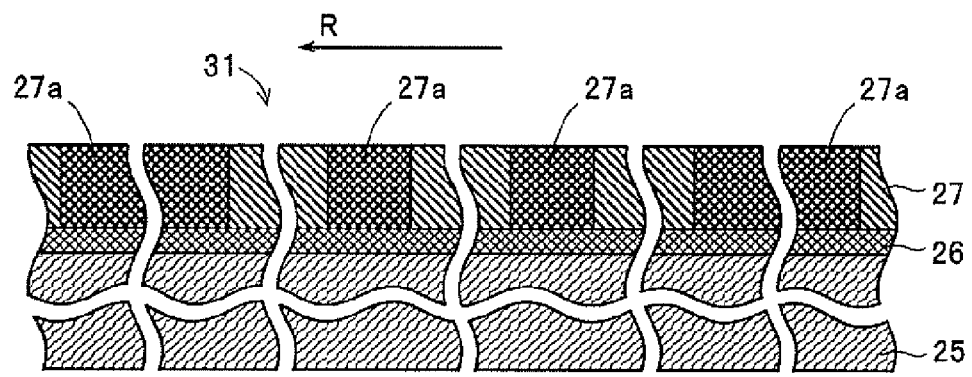
FIG. 18 is a cross-sectional view along the circumferential direction of the disk-shaped base plate in a state where an exposure pattern has been drawn (i.e., a latent image has been formed) by irradiating a resist layer formed on the nickel layer with an electron beam.
Figure 19:
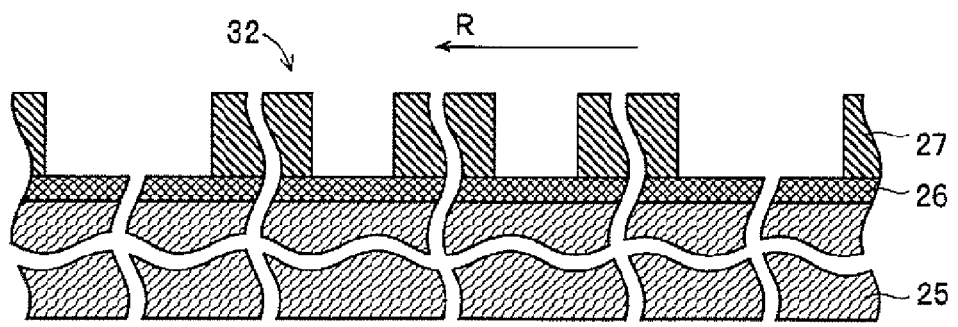
FIG. 19 is a cross-sectional view along the circumferential direction of the disk-shaped base plate in a state where a concave/convex pattern has been formed on the nickel layer by developing the resist in the state shown in FIG. 18.
Figure 20:
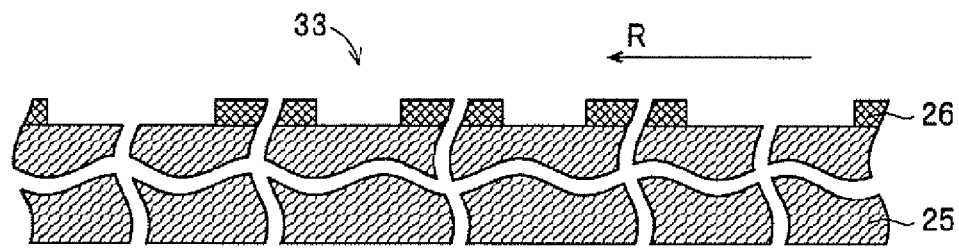
FIG. 20 is a cross-sectional view along the circumferential direction of the disk-shaped base plate in a state where a mask pattern has been formed by etching the nickel layer using the resist layer (the concave/convex pattern) in the state shown in FIG. 19 as a mask.

First, as shown in FIG. 17, by vapor-depositing nickel onto a disk-shaped base plate 25 that is made of silicon and has been polished so that its surface is flat, a nickel layer 26 with a thickness of around 10 nm is formed. It should be noted that the base plate used when manufacturing the stamper 20 is not limited to a silicon base plate, and various kinds of base plate, such as a glass base plate or a ceramic base plate, may be used. Next, as shown in FIG. 18, by spin coating a resist (as one example "ZEP520A" made by ZEON CORPORATION of Japan) onto the nickel layer 26 that has been formed, a resist layer 27 with a thickness of around 100 nm is formed on the surface of the nickel layer 26. The resist used for forming the resist layer 27 is also not limited to the resist given above, and any freely chosen resist material can be used. After this, an electron beam lithography apparatus is used to irradiate the resist layer 27 with an electron beam to draw a desired exposure pattern 31 (in this example, a pattern corresponding to the convex parts 35*a* of the stamper 20). Next, by developing the resist layer 27 in this state, parts corresponding to a latent image 27*a* are removed. By doing so, as shown in FIG. 19, a concave/convex pattern 32 is formed on the nickel layer 26. After this, by etching the nickel layer 26 using the concave/convex pattern 32 (the resist layer 27) as a mask, as shown in FIG. 20, the mask pattern 33 composed of the nickel layer 26 is formed on the disk-shaped base plate 25.

Figure 21:
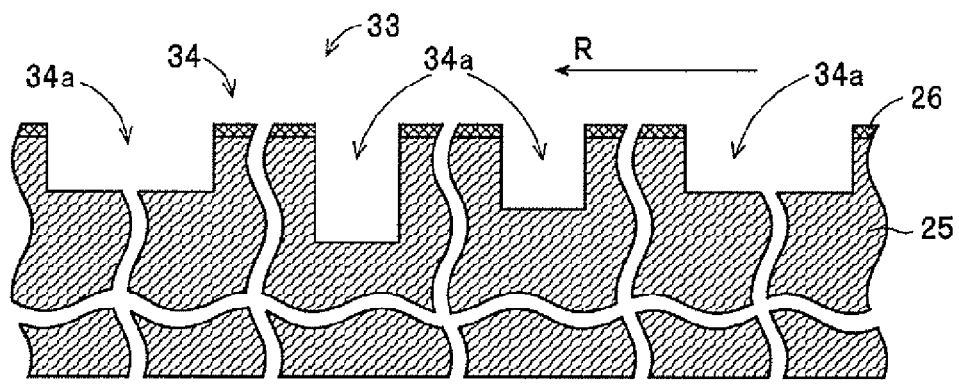
FIG. 21 is a cross-sectional view along the circumferential direction of the disk-shaped base plate in a state where a concave/convex pattern has been formed by carrying out an etching process using the mask pattern.

Next, by carrying out reactive ion etching using a mixture of $CF_4$ and $O_2$, for example, with the nickel layer 26 (a mask pattern 33) on the disk-shaped base plate 25 as a mask, the disk-shaped base plate 25 is etched as shown in FIG. 21 to form a plurality of concave parts 34*a* and thereby form a concave/convex pattern 34. When doing so, the mixed proportions (the flow ratio) of the $CF_4$ and $O_2$, the pressure inside the processing apparatus, the amount of applied energy, the processing time, and the like are appropriately adjusted so that the concave parts 34*a* formed at positions where the lengths in the radial direction or the circumferential direction of parts exposed from the mask pattern 33 are long (i.e., "parts where the openings are wide": for example, parts where the convex parts 35*a*2*c* and the outer peripheries of the convex parts 35*a*2*a*, 35*a*3 of the stamper 20 will be formed) are etched more deeply than the concave parts 34*a* formed at positions where the lengths in the radial direction or the circumferential direction of parts exposed from the mask pattern 33 are short (i.e., "parts where the openings are narrow": for example, parts where the convex parts 35*a*1, 35*a*2*b*, and the inner peripheries of the convex parts 35*a*2*a*, 35*a*3 of the stamper 20 will be formed). As a specific example, a 25-second etching process is carried out with the flow ratio of the $CF_4$ and $O_2$ etching gases set at 35:15 (flow rates of $CF_4$:35 sccm, $O_2$:15 sccm), the pressure inside the processing chamber set at 0.3 Pa, the microwave power set at RF1 kW, and the bias power applied to the disk-shaped base plate 25 set at RF50 W. As a result, as shown in FIG. 21, the concave/convex pattern 34 is formed so that the concave parts 34*a* with wide openings (i.e., where the length in the radial direction or the circumferential direction is long) are deeper than the concave parts 34*a* with narrow openings (i.e., where the length in the radial direction or the circumferential direction is short).

Figure 22:
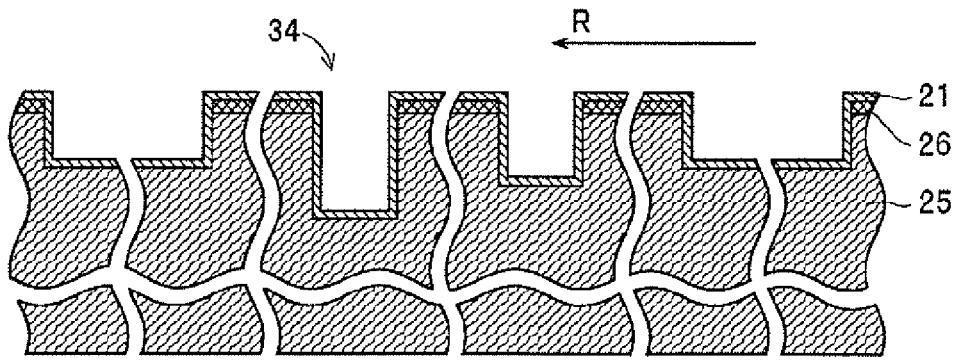
FIG. 22 is a cross-sectional view along the circumferential direction of the disk-shaped base plate in a state where an electrode film has been laminated to cover the concave/convex pattern shown in FIG. 21.
Figure 23:
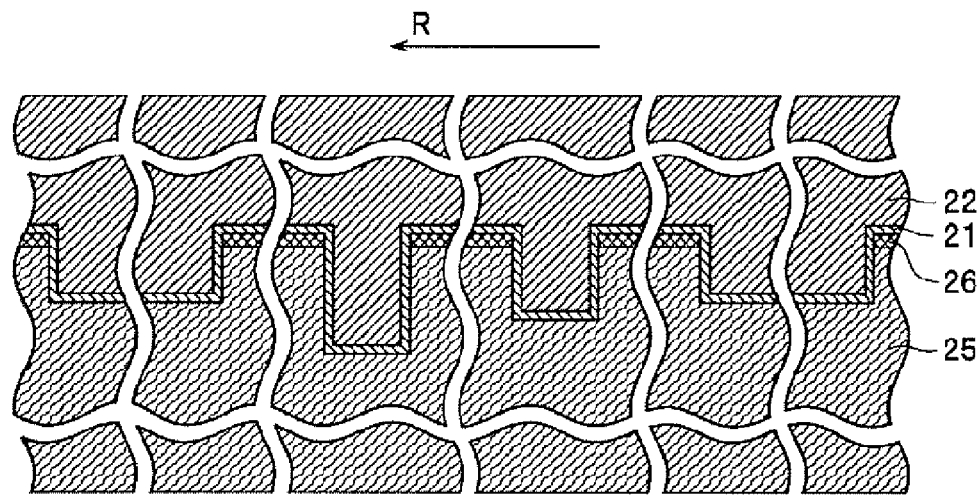
FIG. 23 is a cross-sectional view along the circumferential direction of the disk-shaped base plate in a state where a nickel layer has been formed to cover the electrode film shown in FIG. 22.

Next, the disk-shaped base plate 25 in this state is soaked in potassium permanganate solution, for example, to oxidize the surface of the concave/convex pattern 34 (the surface of the nickel layer 26 on the disk-shaped base plate 25). By doing so, a master matrix (not shown) is completed. Next, as shown in FIG. 22, after an electrode film 21 for electroforming has been formed along the concave/convex form of the concave/convex pattern 34 of the master matrix, electroforming is carried out using the electrode film 21 as an electrode to form the nickel layer 22 on the electrode film 21 as shown in FIG. 23. After this, the multilayer structure composed of the electrode film 21 and the nickel layer 22 (the parts that form the stamper 20) is separated from the multilayer structure composed of the disk-shaped base plate 25 and the nickel layer 26. When doing so, since the surface of the concave/convex pattern 34 has been oxidized, the multilayer structure composed of the electrode film 21 and the nickel layer 22 can be easily separated. By doing so, the concave/convex pattern 34 of the master matrix is transferred to the electrode film 21 and the nickel layer 22 to form the concave/convex patterns 35 (see FIG. 11). After this, the rear surface of the nickel layer 22 is polished to make the rear surface flat and the surface of the electrode film 21 is coated with a fluorochemical material to form the adhesive force reducing film 23. This completes the stamper 20 on which the concave/convex patterns 35 including a plurality of convex parts 35*a* of different lengths in the radial direction, different lengths in the circumferential direction, and different heights from the reference plane X to the protruding ends of the convex parts are formed as shown in FIG. 11.

Next, a process that forms a concave/convex pattern on the perform 10 using the stamper 20 described above in accordance with the imprinting method according to the present invention will be described with reference to the drawings.

First, the preform 10 and the stamper 20 are set in the press 110. More specifically, the preform 10 is attached to the hot plate 111 with the formation surface of the resin layer 14 facing upward and the stamper 20 is attached to the hot plate 112 with the formation surface of the concave/convex patterns 35 facing downward. After this, the control unit 120 controls the hot plates 111, 112 so that both the preform 10 and the stamper 20 are heated. At this time, the hot plates 111, 112 heat both the preform 10 and the stamper 20 to around 170° C., which is around 100° C. higher than the glass transition point (in this example, around 70° C.) of the novolac resin forming the resin layer 14. By doing so, the resin layer 14 softens and becomes easy to mold. Here, heating to a temperature in a range of 70° C. to 120° C., inclusive higher than the glass transition point of the resin material is preferable, with heating to at least 100° C. higher than the glass transition point being more preferable. By doing so, as described later, it becomes easy to press the stamper 20 onto the resin layer 14.

Next, the control unit 120 controls the raising/lowering mechanism 113 to lower the hot plate 112 toward the hot plate 111 to press, as shown in FIG. 24, the concave/convex patterns 35 of the stamper 20 onto the resin layer 14 of the preform 10 on the hot plate 111 (the "stamper pressing process" for the present invention). Note that in FIG. 24 and in FIGS. 25 and 26 described later, for ease of understanding the present invention, the lengths of the convex parts 35a and the openings of the concave parts 35b in the concave/convex patterns 35 have been illustrated with different lengths and openings to the actual concave/convex patterns 35. At this time, in accordance with control by the control unit 120, as one example the raising/lowering mechanism 113 maintains a state where a load of 34 kN is applied across the entire stamper 20 for five minutes. In accordance with control by the control unit 120, the hot plates 111, 112 continuously carry out a heating process so that the temperatures of the preform 10 and the stamper 20 do not fall while the stamper 20 is being pressed onto the preform 10 by the raising/lowering mechanism 113. Note that during the heating process, the temperature should preferably be maintained in a range of 170° C. ±1° C. (as one example, a temperature that only changes in a range of ±0.2° C.). By doing so, as shown in FIGS. 25 to 28, the concave/convex patterns 35 of the stamper 20 are transferred to the resin layer 14 to form the concave/convex pattern 36 that includes a plurality of concave parts 36b.

Here, as described earlier, on the stamper 20 used by the imprinting apparatus 100, the concave/convex patterns 35 are formed so that the height of the part of each of the convex parts 35a from the reference plane X to the protruding end of the convex part increases as the length in the circumferential direction of the part of the convex part 35a formed in the servo pattern forming regions Ass increases, and at positions with the same radius, the height from the reference plane X to the protruding ends of the convex parts increases as the length in the circumferential direction of convex parts 35a increases. Accordingly, when the stamper 20 is pressed onto the resin layer 14 with uniform pressing force being applied across the entire stamper 20, parts of the convex parts 35a that are long in the circumferential direction (parts corresponding to an outer periphery of the information recording medium 1, for example: in this example, the outer peripheries of the convex parts 35a2a, 35a3), and convex parts 35a that are long in the circumferential direction (in this example, convex parts 35a2c and the like) are deeply pressed into the resin layer 14.

On the stamper 20 used by the imprinting apparatus 100, the convex parts 35a2 inside the servo pattern forming regions Ass are formed so that at positions where the length in the direction corresponding to the circumferential direction is longer than the length L1 in the radial direction of the convex parts 35a1 formed in the data track pattern forming regions Ats, the height from the reference plane X to the protruding ends of the convex parts 35a2 is higher than the height H1 of the convex parts 35a1. Accordingly, when the stamper 20 is pressed onto the resin layer with a uniform pressing force across the entire stamper 20, parts where the length in the circumferential direction of the convex parts 35a2 inside the servo pattern forming regions Ass is longer than the length L1 in the radial direction of the convex parts 35a1 (in this example, the outer peripheries of the convex parts 35a2a, 35a2b, and the like) and the convex parts 35a2 whose length in the circumferential direction is longer than the length L1 in the radial direction of the convex parts 35a1 (in this example, the convex parts 35a2c and the like) are pressed sufficiently deeply into the resin layer 14 in the same way as the convex parts 35a1 and the like. Also, the convex parts 35a3 for forming the burst patterns are formed so that the height from the reference plane X to the protruding ends between two concave parts 35b3 that are adjacent in the circumferential direction becomes gradually higher from the inner periphery to the outer periphery (so that between two concave parts 35b3, the height of the part of each of the convex parts 35a3 increases as the length of the part of the convex parts 35a3 increases) and so that the height is higher than the height H1 of the convex parts 35a1 across the entire stamper. Accordingly, when the stamper 20 is pressed onto the resin layer with a uniform pressing force across the entire stamper 20, the convex parts 35a3 that are difficult to press into the resin layer 14 due to their large surface area relative to the concave parts 35b3 are also deeply pressed into the resin layer 14 in the same way as the convex parts 35a1, 35a2, and the like described above. As a result, the convex parts 35a with different lengths in the radial direction and different lengths in the circumferential direction are pressed into the resin layer 14 substantially uniformly across the entire data track pattern forming regions Ats and the servo pattern forming regions Ass.

Figure 25:
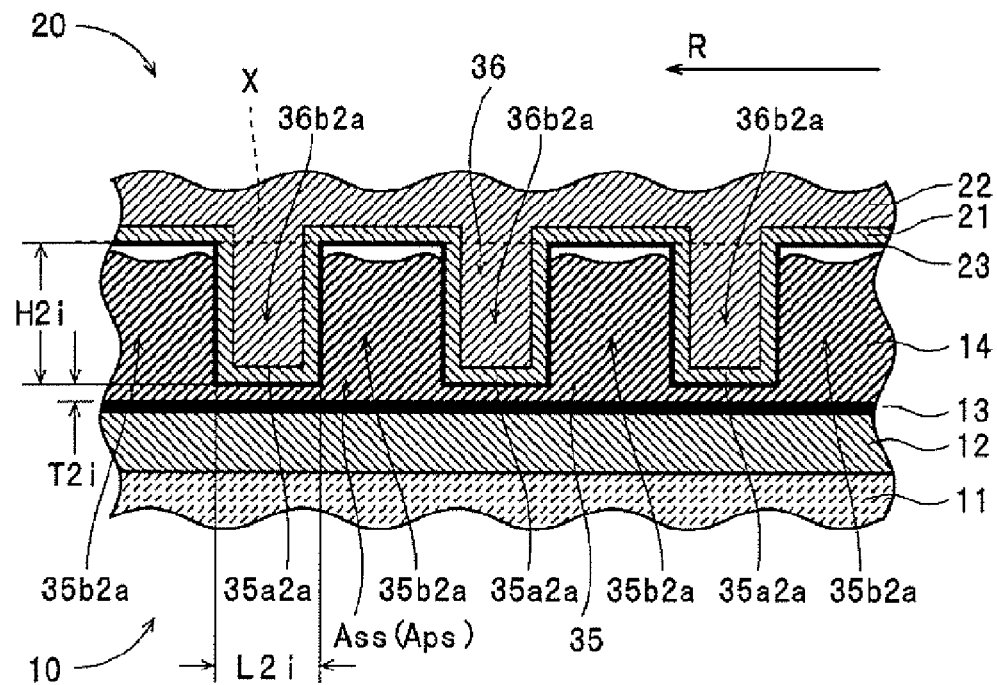
FIG. 25 is a cross-sectional view of the peripheries of positions where the inner peripheries of convex parts have been pressed in the state shown in FIG. 24.
Figure 26:
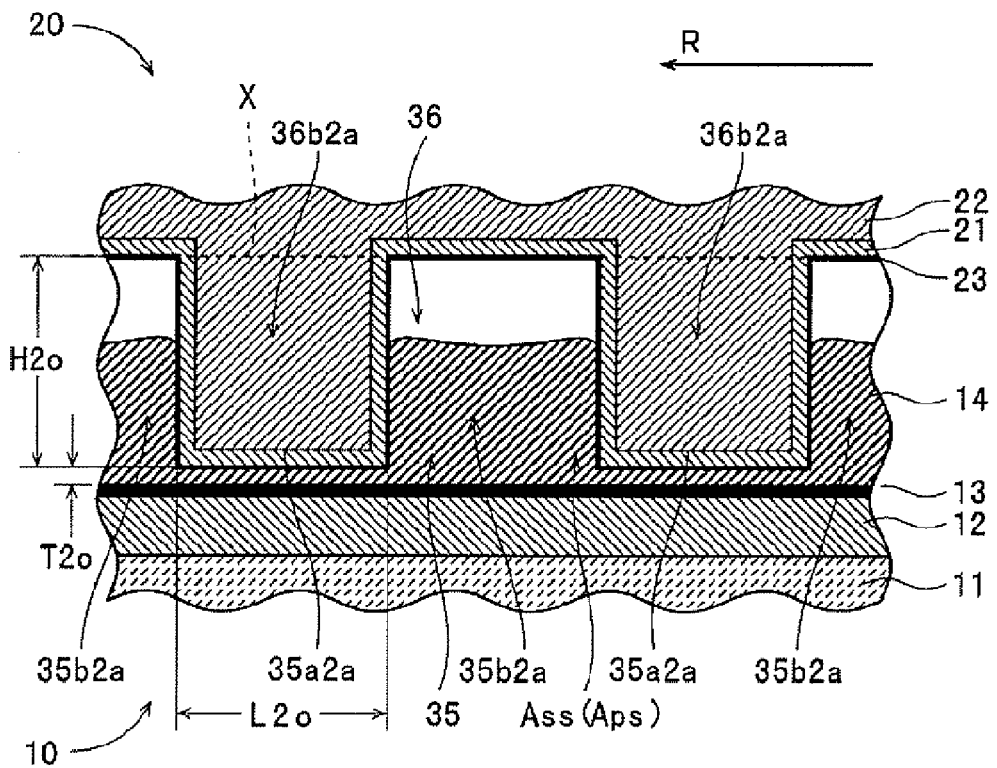
FIG. 26 is a cross-sectional view of the peripheries of positions where the outer peripheries of the convex parts have been pressed in the state shown in FIG. 24.

As a specific example, as shown in FIG. 25, in the inner peripheries of the convex parts 35a2a (the convex parts 35a for forming the preamble patterns) whose length L2i in the circumferential direction is 56 nm, the resin layer 14 at positions where the convex parts 35a2a have been pressed in moves smoothly toward the concave parts 35b2a of the stamper 20, resulting in the convex parts 35a2a being pressed sufficiently deeply into the resin layer 14 of the preform 10. Accordingly, the thickness T2i of the residue (the resin layer 14 between the bottom surfaces of the concave parts 36b2a and the surface of the metal layer 13) at positions where the inner peripheries of the convex parts 35a2a are pressed in is around 28 nm±3 nm. On the other hand, as shown in FIG. 26, in the outer peripheries of the convex parts 35a2a whose length L2o in the circumferential direction is 147 nm, since the height H2o from the reference plane X to the protruding ends at the outer peripheries of the convex parts 35a2a is 88 nm which is around 8 nm higher than the height H2i (see FIG. 25) in the inner peripheries of the convex parts 35a2a, the wide parts in the outer peripheries of the convex parts 35a2a that are more difficult to press into the resin layer 14 than the inner peripheries are pressed sufficiently deeply into the resin layer 14. Accordingly, the thickness T2o of the residue (the resin layer 14 between the bottom surfaces of the concave parts 36b2a and the surface of the metal layer 13) at positions where the outer peripheries of the convex parts 35a2a are pressed in is around 29 nm±3 nm.

Figure 27:
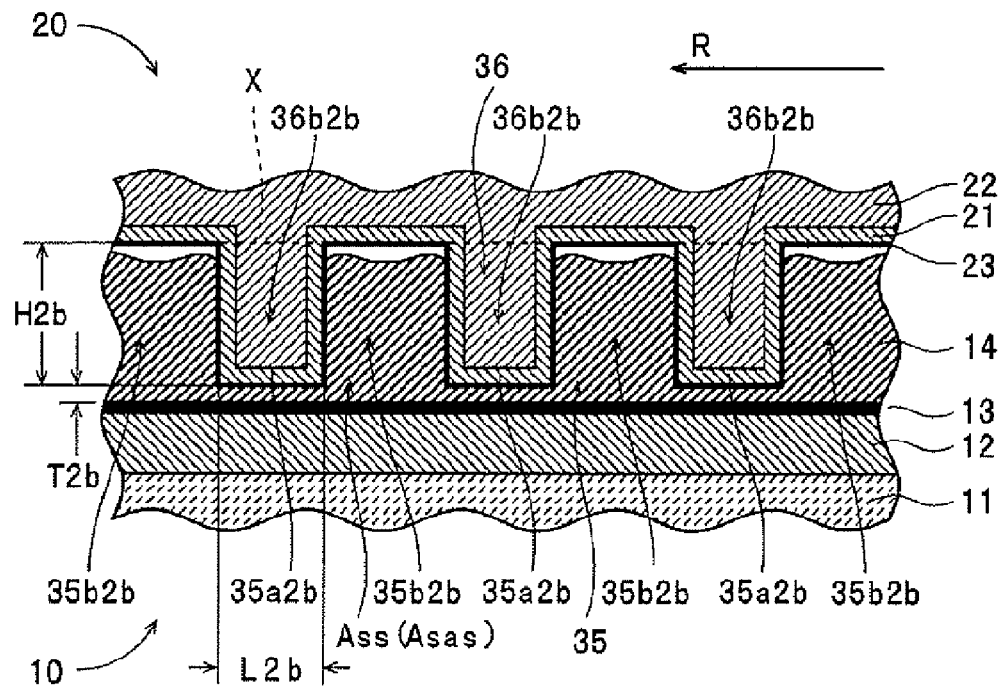
FIG. 27 is a cross-sectional view of the peripheries of positions where other convex parts have been pressed in the state shown in FIG. 24.
Figure 28:
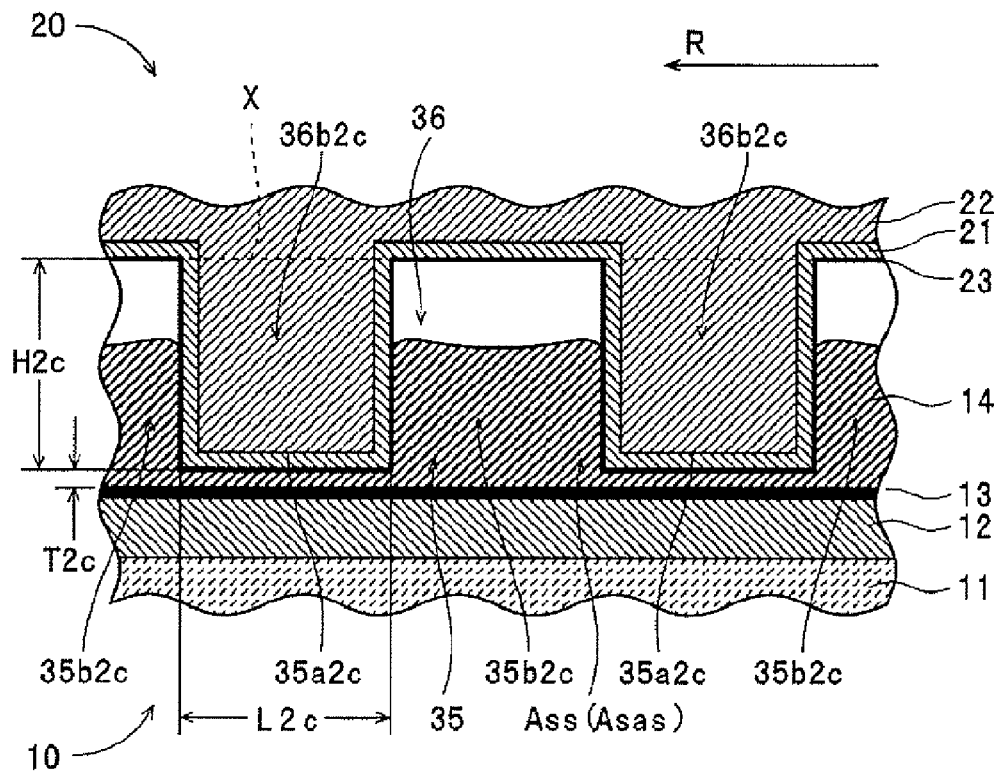
FIG. 28 is a cross-sectional view of the peripheries of positions where other convex parts have been pressed in the state shown in FIG. 24.

Also, as shown in FIG. 27, at the formation positions of the convex parts 35a2b whose length L2b in the circumferential direction is 56 nm in the inner periphery (i.e., the convex parts 35a for forming sector address patterns that are two bits long), the resin layer 14 at positions where the convex parts 35a2b are pressed in moves smoothly toward the concave parts 35b2b of the stamper 20, resulting in the convex parts 35a2b being pressed sufficiently deeply into the resin layer 14 of the preform 10. Accordingly, the thickness T2b of the residue (the resin layer 14 between the bottom surfaces of the concave parts 36b2b and the surface of the metal layer 13) at the inner peripheries of the positions where the convex parts 35a2b are pressed in is around 28 nm±3 nm. On the other hand, as shown in FIG. 28, at formation positions of the convex parts 35a2c whose length L2c in the circumferential direction is 226 nm in the inner periphery (i.e., the convex parts 35a for forming sector address patterns that are eight bits long), since the height H2c from the reference plane X to the protruding ends at the inner peripheries of the convex parts 35a2c is 90 nm which is around 10 nm higher than the height H2b (see FIG. 27) of the inner peripheries of the convex parts 35a2b, the wide convex parts 35a2c that are difficult to press into the resin layer 14 than the convex parts 35a2b are pressed sufficiently deeply into the resin layer 14. Accordingly, the thickness T2c of the residue (the resin layer 14 between the bottom surfaces of the concave parts 36b2c and the surface of the metal layer 13) at the inner peripheries, for example, of the positions where the convex parts 35a2c are pressed in is around 29 nm±3 nm.

On the stamper 20, like the convex parts 35a2a for forming the preamble patterns, the convex parts 35a2c for forming the (eight bits long) sector address patterns with a length in the circumferential direction of 226 nm in the inner periphery and of 587 nm in the outer periphery are formed so that the height thereof from the reference plane X to the protruding ends gradually increases from the inner periphery to the outer periphery, with a height of 90 nm in the inner periphery and of 98 nm in the outer periphery. This means that even the outer peripheries of the convex parts 35a2c (i.e., parts of the convex parts 35a2c that are wider than the inner peripheries) that are difficult to press into the resin layer 14 are pressed into the resin layer 14 sufficiently deeply. Also, in the same way as the convex parts 35a2a for forming the preamble patterns, the convex parts 35a2b for forming the (two bits long) sector address patterns whose length in the circumferential direction is 56 nm in the inner periphery and 147 nm in the outer periphery are formed so that the height from the reference plane X to the protruding ends gradually increases from the inner periphery to the outer periphery, so that the height is 80 nm in the inner periphery and 88 nm in the outer periphery. This means that even the outer peripheries of the convex parts 35a2b that are difficult to press into the resin layer 14 (i.e., parts of the convex parts 35a2b that are wider than the inner peripheries) are pressed into the resin layer 14 sufficiently deeply.

In addition, the convex parts 35a3 for forming burst patterns whose length in the circumferential direction between two adjacent concave parts 35b3 in the circumferential direction is 56 nm in the inner periphery and is 147 nm in the outer periphery are formed so that the height from the reference plane X to the protruding ends of the convex parts between two concave parts 35b3 gradually increases from the inner periphery to the outer periphery, with a height of 92 nm in the inner periphery and a height of 101 nm in the outer periphery. This means that the convex parts 35a3 can be pressed sufficiently deeply into the resin layer 14 across the entire range from the inner periphery to the outer periphery. Also, on the stamper 20, at positions where the length in the circumferential direction of the convex parts 35a2 for forming the preamble patterns and the sector address patterns in the servo pattern forming regions Ass is longer than the length L1 in the radial direction of the convex parts 35a1 inside the data track pattern forming regions Ats, the convex parts 35a2 are formed so that the height thereof from the reference plane X to the protruding ends is higher than the height H1 of the convex parts 35a1. In addition, the convex parts 35a3 for forming the burst patterns are formed so that the height thereof from the reference plane X to the protruding ends between two adjacent concave parts 35b3 in the circumferential direction gradually increases from the inner periphery to the outer periphery and so that the height is higher than the height H1 of the convex parts 35a1 across the entire range of the stamper 20. Accordingly, the convex parts 35a inside the data track pattern forming regions Ats and the convex parts 35a inside the servo pattern forming regions Ass are pressed into the resin layer 14 sufficiently deeply and to a similar extent. As a result, the thickness of the residue at positions where the convex parts 35a with different lengths in the radial direction and in the circumferential direction are pressed in becomes substantially equal across the entire range of the data track pattern forming regions Ats and the servo pattern forming regions Ass.

Figure 29:
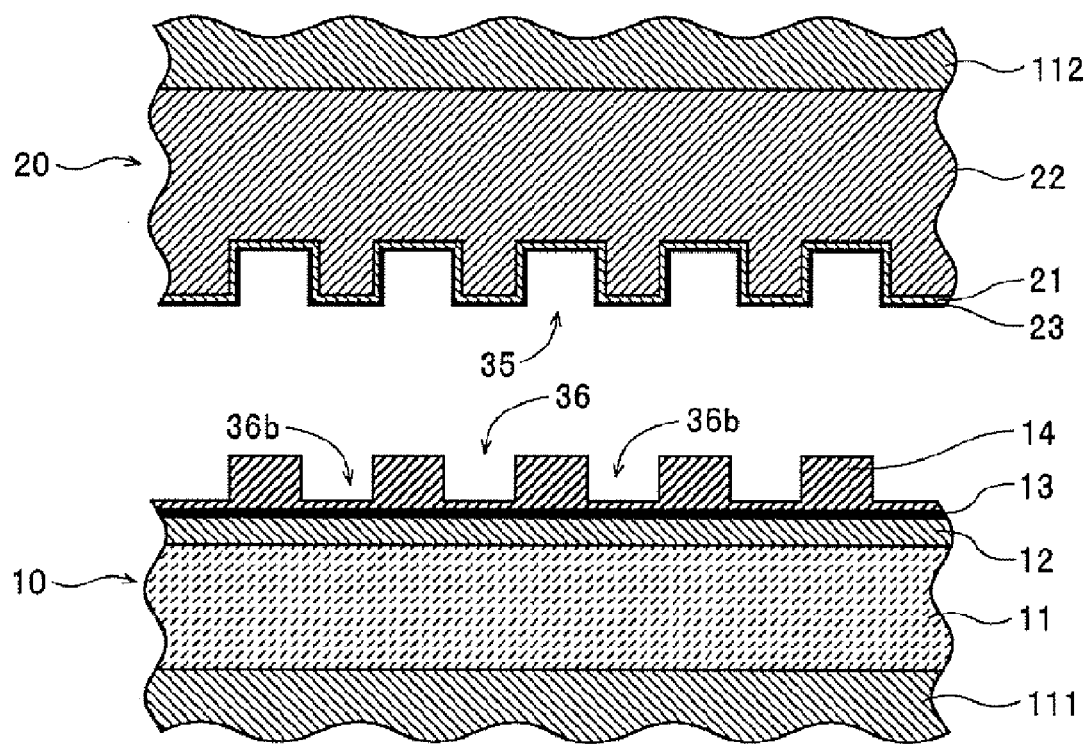
FIG. 29 is a cross-sectional view of a state where a concave/convex pattern has been formed by separating the stamper from the preform in the state shown in FIG. 24.

Next, while controlling the hot plates 111, 112 to have the heating process continued (to keep the temperature in a range of 170° C.±1° C.), as shown in FIG. 29, the control unit 120 controls the raising/lowering mechanism 113 to raise the hot plate 112 and thereby separate the stamper 20 from the preform 10 (the resin layer 14) (the "stamper separating process" for the present invention). By doing so, the concave/convex form of the concave/convex patterns 35 of the stamper 20 is transferred to the resin layer 14 of the preform 10, thereby forming the concave/convex pattern 36 on the metal layer 13. This completes the imprinting process.

Next, the process for manufacturing the information recording medium 1 according to the method of manufacturing an information recording medium according to the present invention will be described with reference to the drawings.

Figure 30:
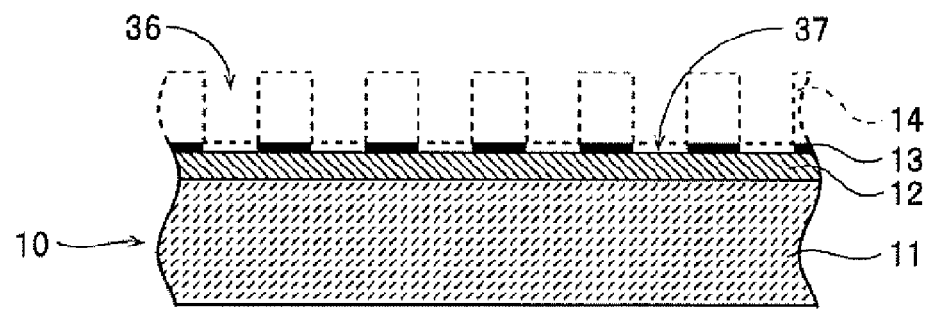
FIG. 30 is a cross-sectional view of a state where a concave/convex pattern has been formed by etching a metal layer using the concave/convex pattern shown in FIG. 29.
Figure 31:
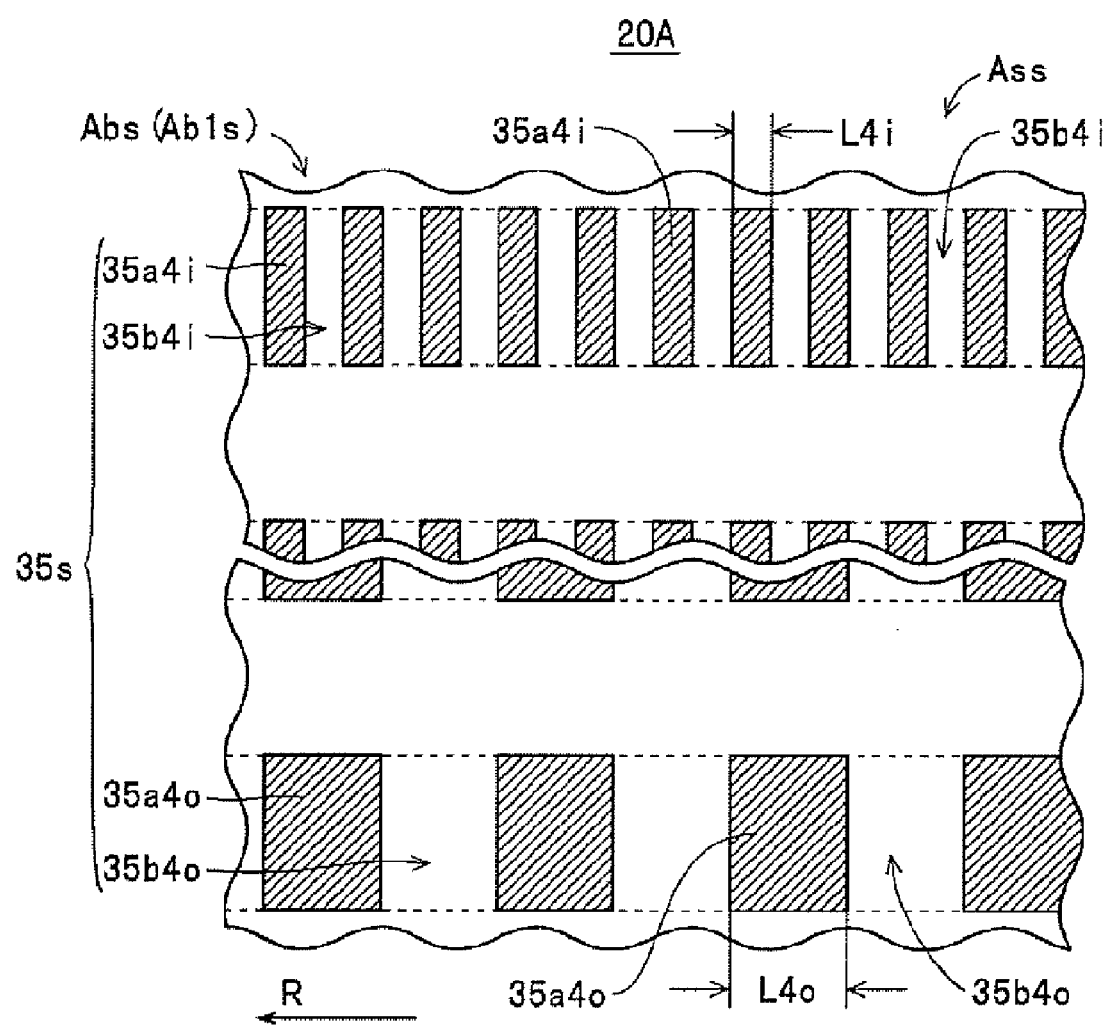
FIG. 31 is a plan view of a burst pattern forming region inside a servo pattern forming region of another stamper.

First, the resin material (residue) remaining on the bottom surfaces of the concave parts in the concave/convex pattern 36 in the resin layer 14 is removed by an oxygen plasma process. When doing so, since the thickness of the residue on the metal layer 13 is extremely thin and substantially even in a range of 25 nm to 32 nm, inclusive, across the entire preform 10, it is possible to avoid a situation where the openings of the concave parts change to unintended openings (that is, where the side wall surfaces of the concave parts are badly eroded) when the residue is removed. Next, an etching process that uses a metal-etching gas is carried out with the concave/convex pattern 36 (i.e., the convex parts) as a mask. When doing so, as shown in FIG. 30, the parts of the metal layer 13 at the bottom surfaces of the concave parts of the concave/convex pattern 36 are removed so that concave/convex patterns 37 composed of the metal material are formed on the magnetic layer 12. Next, an etching process is carried out using a gas for etching the magnetic material, with the concave/convex patterns 37 (the remaining metal layer 13) being used as a mask. By doing so, parts of the magnetic layer 12 than are exposed from the concave/convex patterns 37 are removed.

Next, the metal layer 13 remaining on the magnetic layer 12 is removed by carrying out an etching process using a metal-etching gas. By doing so, as shown in FIG. 3, the concave/convex patterns 5 (the concave/convex patterns 5t, 5s) are formed. In such concave/convex patterns 5, grooves corresponding to the concave parts in the concave/convex pattern 36 produced by transferring the concave/convex form of the stamper 20 are formed in the magnetic layer 12. Next, a surface treatment process is carried out. During this surface treatment process, after the grooves have first been filled with silicon dioxide (not shown), for example, the surface is smoothed by carrying out ion-beam etching. After this, a protective film composed of DLC (Diamond-Like Carbon), for example, is formed on the smoothed surface and finally a lubricant is applied. By doing so, the information recording medium 1 is completed. In this case, since the information recording medium 1 is manufactured using the concave/convex patterns 37 formed using the concave/convex pattern 36 whose concave parts are formed so that the openings have the desired widths, the concaves 5b in the concave/convex patterns 5 (the data recording tracks, servo patterns, and the like) formed using the concave/convex patterns 36, 37 also have openings with the desired widths. As a result, the occurrence of recording errors and reproduction errors is avoided for the information recording medium 1.

In this way, according to the stamper 20 and the imprinting method that uses the stamper 20, by forming each of the first convex parts (i.e., the convex parts 35a2a to 35a2c in the servo pattern forming regions Ass) for the present invention so that the height of the part of the first convex parts from the reference plane X to the protruding end of the convex part increases as the length in the circumferential direction of the part of the convex part increases, when the stamper 20 is pressed onto the resin layer 14 with a uniform pressing force across the entire stamper 20 during imprinting, it is possible to press the outer peripheries and the like of the first convex parts, which are difficult to press into the resin layer 14, sufficiently deeply into the resin layer 14. This means that the first convex parts in the servo pattern forming regions Ass can be pressed into the resin layer 14 to a similar extent across the entire range from the inner periphery to the outer periphery of the first convex parts and sufficiently deeply into the resin layer 14. As a result, it is possible to make the thickness of the residue on the metal layer 13 uniform in regions corresponding to the servo pattern forming regions of the preform 10. Accordingly, since the time required to remove the residue can be made substantially equal across the entire regions corresponding to the servo pattern regions, it is possible to avoid a situation where the concave parts 36b in the concave/convex pattern 36 transferred to the resin layer 14 in the inner peripheries of regions corresponding to the servo pattern regions, for example, are formed with unintentionally wide openings due to the side wall surfaces of the concave parts 36b being eroded. By doing so, it is possible to precisely form the concave/convex pattern 36 including concave parts with the desired opening widths across the entire range from the inner periphery to the outer periphery of each region corresponding to a servo pattern region.

Also, according to the stamper 20 and the imprinting method that uses the stamper 20, by forming, at positions with the same radius, the first convex parts for the present invention (i.e., the convex parts 35a2a to 35a2c inside the servo pattern forming regions Ass) so that the height thereof from the reference plane X to the protruding ends of the convex parts 35a2 increases as the length in the circumferential direction increases, when the stamper 20 is pressed onto the resin layer 14 with a uniform pressing force across the entire stamper 20 during imprinting, the first convex parts which have a long length in the circumferential direction and are therefore difficult to press into the resin layer 14 (for example, the convex parts 35a2c) can be pressed into the resin layer 14 sufficiently deeply and to a similar extent as the first convex parts which have a short length in the circumferential direction (for example, the convex parts 35a2b). Since the first convex parts in the servo pattern forming regions Ass can be pressed to a similar extent and sufficiently deeply into the resin layer 14, the thickness of the residue on the metal layer 13 can be made uniform in regions corresponding to the servo pattern forming regions of the preform 10. Accordingly, since the time required to remove the residue can be made substantially equal across the entire regions corresponding to the servo pattern regions, it is possible to avoid a situation where out of the concave parts 36b in the concave/convex pattern 36 transferred to the resin layer 14 in the regions corresponding to the servo pattern regions, the concave parts 36b that are short in the circumferential direction are formed with unintentionally wide openings due to the side wall surfaces of the concave parts 36b being eroded. By doing so, it is possible to form the concave/convex pattern 36 including concave parts with the desired opening widths across the entire range of the regions corresponding to the servo pattern regions.

Also, according to the stamper 20 and the imprinting method that uses the stamper 20, by forming the convex parts 35a2 in the servo pattern forming regions Ass so that the height of the convex parts 35a2 is higher than the height H1 of the convex parts 35a1 at positions where the length in the circumferential direction of the convex parts 35a2 is longer than the length L1 in the radial direction of the second convex parts for the present invention (convex parts 35a1) formed in the data track pattern forming regions Ats, when the stamper 20 is pressed onto the resin layer 14 with a uniform pressing force across the entire range (i.e., the data track pattern forming regions Ats and the servo pattern forming regions Ass) of the stamper 20 during imprinting, the convex parts 35a2 whose length in the circumferential direction in the outer periphery is longer than the length L1 in the radial direction of the convex parts 35a1 for forming the data track patterns (for example, the convex parts 35a2a for forming the preamble patterns and the convex parts 35a2b for forming the sector address patterns) and the convex parts 35a2 whose length L2c in the circumferential direction is longer than the length L1 in the radial direction of the convex parts 35a1 for forming the data track patterns (for example, the convex parts 35a2c for forming the sector address patterns) can be pressed sufficiently deeply into the resin layer 14 and to a similar extent as the convex parts 35a1 for forming the data track patterns. This means that the thickness of the residue in the data track pattern forming regions and the thickness of the residue in the servo pattern forming regions Ass can be made substantially uniform. Accordingly, since the time required to remove the residue can be made substantially equal across the entire preform, it is possible to avoid a situation where the concave parts 36b in the concave/convex pattern 36 transferred to the resin layer 14 are formed with unintentionally wide openings due to the side wall surfaces of the concave parts 36b being eroded. By doing so, it is possible to precisely form the concave/convex pattern 36 including concave parts with the desired opening widths across both the data track pattern regions and the servo pattern regions.

Also, according to the stamper 20 and the imprinting method that uses the stamper 20, since between concave parts 35b3 corresponding to the individual burst regions, each of the third convex parts for the present invention (the convex parts 35a3) is formed in the burst pattern forming regions Abs so that the height of the part of the third convex part from the reference plane X to the protruding ends increases as the length of the part of the third convex part in the circumferential direction increases, when the stamper 20 is pressed onto the resin layer 14 with a uniform pressing force across the entire stamper 20 during imprinting, the outer peripheries of the convex parts 35a3 that are difficult to press into the resin layer 14 can be pressed sufficiently deeply into the resin layer 14. Since the convex parts 35a3 in the burst pattern forming regions Abs can be pressed into the resin layer 14 sufficiently deeply and to the same extent across the entire range from the inner periphery to the outer periphery, it is possible to make the thickness of the residue on the metal layer 13 uniform in the regions corresponding to the burst pattern regions of the preform 10. Accordingly, since the time required to remove the residue can be made substantially equal across the entire regions corresponding to the burst pattern regions, it is possible to avoid a situation where the concave parts 36b in the concave/convex pattern 36 transferred to the resin layer 14 in the inner peripheries of regions corresponding to the burst pattern regions are formed with unintentionally wide openings due to the side wall surfaces of the concave parts 36b being eroded. By doing so, it is possible to precisely form the concave/convex pattern 36 including concave parts with the desired opening widths across the entire range from the inner peripheries to the outer peripheries of the regions corresponding to the burst pattern regions.

Also, according to the method of manufacturing the information recording medium 1 using the stamper 20, by manufacturing the information recording medium 1 using the concave/convex pattern 36 transferred to the resin layer 14 by the imprinting method described above, it is possible to form the servo patterns in the servo pattern regions As using a precise concave/convex pattern 36 in which concave parts with the desired opening widths have been formed in the entire ranges from the inner peripheries to the outer peripheries of the regions corresponding to the servo pattern regions, for example. By doing so, it is possible to form the servo patterns with high precision inside the servo pattern regions As. Accordingly, it is possible to manufacture an information recording medium from which servo signals can be reliably obtained and therefore the magnetic head can be properly kept on a desired data recording track, so that data can be properly recorded on the data recording tracks and data can be properly read from the data recording tracks.

Note that the present invention is not limited to the construction and method described above. For example, although an example has been described where the convex parts 35a3 inside the burst pattern forming regions Abs are formed higher than the convex parts 35a1 inside the data track pattern forming regions Ats across the entire range from the inner periphery to the outer periphery, if the length in the circumferential direction between the concave parts 35b3 that are disposed in the circumferential direction in the inner periphery (i.e., the length in the circumferential direction of the convex parts 35a3) is shorter than the prescribed length on the stamper 20 described above, for example, the convex parts 35a3 can be formed lower than the convex parts 35a1 at such positions. Also, although the stamper 20 with the concave/convex patterns 35 where parts corresponding to the individual burst regions of the information recording medium 1 are composed of the concave parts 35b3 has been described, like a stamper 20A shown in FIG. 31, it is possible to form the stamper-side concave/convex patterns for the present invention so that parts corresponding to the individual burst regions of the information recording medium (not shown) are composed of convex parts. Note that since the concave/convex patterns 35 formed in regions aside from the burst pattern forming regions Abs are the same as the concave/convex patterns 35 of the stamper 20 described earlier, such patterns have been omitted from the following description and the drawings.

Here, in the burst pattern forming regions Abs of the stamper 20A, as one example a plurality of convex parts 35a (the convex parts 35a4i and the convex parts 35a4o), which are parallelogram-shaped when viewed from above and are capable of manufacturing an information recording medium with burst patterns where the individual burst regions are composed of concave parts, are formed at positions corresponding to the individual burst regions. The convex parts 35a formed in the burst pattern forming regions Abs (as one example, the region Ab1s) are one example of "fourth convex parts" for the present invention and the length in the circumferential direction of the convex parts 35a is set so as to gradually increase from the inner periphery to the outer periphery. More specifically, as shown in FIG. 32 (i.e., the "burst pattern forming convex parts" in FIG. 32), the convex parts 35a are formed so that the length in the circumferential direction in regions corresponding to the inner periphery of the information recording medium (i.e., the length L4i of the convex parts 35a4i shown in FIG. 31) is 56 nm, and the length in the circumferential direction in regions corresponding to the outer periphery of the information recording medium (i.e., the length L4o of the convex parts 35a4o shown in FIG. 31) is 147 nm. Note that the length in the circumferential direction of the concave parts 35b (concave parts 35b4i, 35b4o and the like) in the burst pattern forming regions Abs is set substantially equal to the length of the convex parts 35a at positions with the same radius inside the burst pattern forming regions Abs, for example.

The convex parts 35a formed in the burst pattern forming regions Abs of the stamper 20A are formed so that the height thereof from the reference plane X to the protruding ends increases as the length in the circumferential direction of the convex parts 35a increases. More specifically, as shown in FIG. 32, the convex parts 35a4i whose length L4i in the circumferential direction is 56 nm (i.e., the convex parts 35a in the inner peripheries of the burst pattern forming regions Abs) are formed so that the height thereof from the reference plane X to the protruding ends (that is, the protruding length of the convex parts 35a4i) is 70 nm. The convex parts 35a4o whose length L4o in the circumferential direction is 147 nm (i.e., the convex parts 35a in the outer peripheries of the burst pattern forming regions Abs) are formed so that the height thereof from the reference plane X to the protruding ends (that is, the protruding length of the convex parts 35a4o) is 82 nm. In this way, on the stamper 20A, the concave/convex patterns 35 are formed in the burst pattern forming regions Abs so that the height from the reference plane X to the protruding ends of the convex parts 35a increases as the length in the circumferential direction of the convex parts 35a increases. By doing so the convex parts 35a4o in the outer periphery that are difficult to press into the resin layer 14 during imprinting can be pressed sufficiently deeply into the resin layer 14 and to the same extent as the convex parts 35a4i in the inner periphery.

In this way, since the convex parts 35a corresponding to the individual burst regions (i.e., the fourth convex parts) are formed so that the height increases as the length in the circumferential direction of the convex parts 35a increases, when the stamper 20A is pressed onto the resin layer 14 with a uniform pressing force across the entire stamper 20A during imprinting, the convex parts 35a4o and the like in the outer periphery that are difficult to press into the resin layer 14 can be pressed sufficiently deeply into the resin layer 14. Since the convex parts 35a4i in the inner peripheries to the convex parts 35a4o in the outer peripheries of the burst pattern forming regions Abs can be pressed sufficiently deeply and to a similar extent into the resin layer 14, it is possible to make the thickness of the residue on the metal layer 13 uniform in the region corresponding to the burst pattern regions of the preform 10. Accordingly, since it is possible to make the time required to remove the residue substantially equal across the entire regions corresponding to the burst pattern regions, it is possible to avoid a situation where the concave parts 36b in the concave/convex pattern 36 transferred to the resin layer 14 in the inner peripheries of the regions corresponding to the burst pattern regions are formed with unintentionally wide openings due to the side wall surfaces of the concave parts 36b being eroded. By doing so, it is possible to precisely form a concave/convex pattern 36 including concave parts with the desired opening widths across the entire range from the inner periphery to the outer periphery of each region corresponding to the burst pattern regions.

Figure 33:
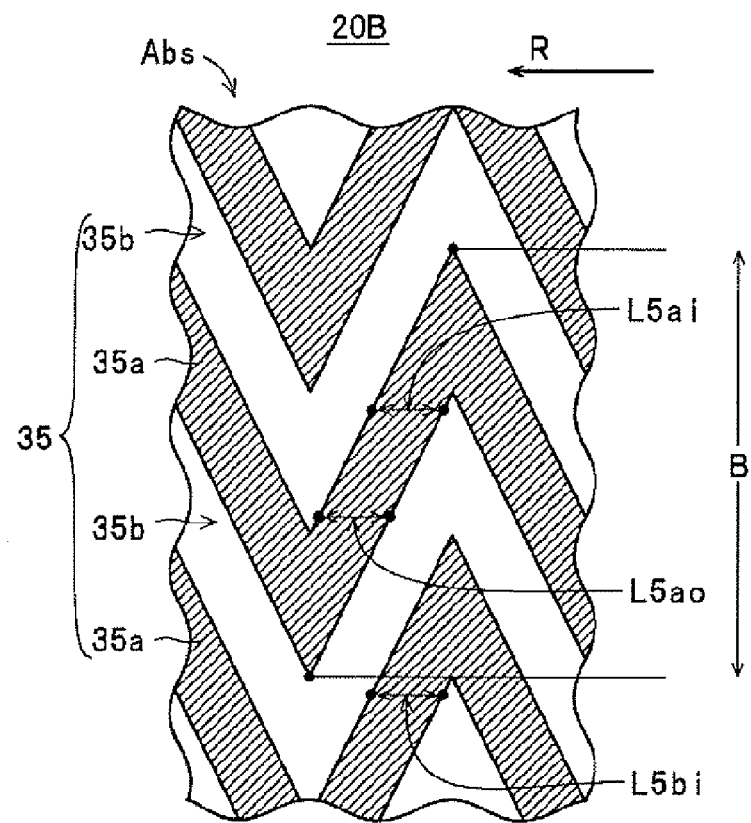
FIG. 33 is a plan view of a burst pattern forming region inside a servo pattern forming region of another stamper.

Also, although the stampers 20, 20A with burst patterns where parallelogram-shaped individual burst regions are disposed in the circumferential direction have been described, it is possible to apply the present invention to a stamper that can form burst patterns where oval or circular individual burst regions are disposed in the circumferential direction. In addition, like the stamper 20B shown in FIG. 33, for example, it is possible to apply the present invention to a construction where the burst patterns are composed of concave/convex patterns 35 in which a plurality of convex parts 35a (a plurality of concave parts 35b) shaped as zigzags in the circumferential direction are disposed in the radial direction. The convex parts 35a formed in the burst pattern forming regions Abs of the stamper 20B are one example of "first convex parts" for the present invention and have a part shown by the arrow B in FIG. 33 that is "formed continuously in the radial direction". This means that the convex parts 35a are formed so that the length in the circumferential direction of the part shown by the arrow B gradually increases from the inner periphery (the top in FIG. 33) to the outer periphery (the bottom in FIG. 33). More specifically, as shown in FIG. 33, the convex parts 35a are formed so that the length L5ao in the circumferential direction in the outer periphery is longer than the length L5ai in the circumferential direction in the inner periphery, for example. Accordingly, the convex parts 35a formed inside the burst pattern forming regions Abs should preferably be formed so that the height of parts that are continuous along the radial direction (the parts shown by the arrow B in FIG. 33) gradually increases from the inner periphery to the outer periphery.

The convex parts 35a inside the burst pattern forming regions Abs are formed so that the length in the circumferential direction of the convex parts 35a formed in the outer periphery becomes gradually longer than that of the convex parts 35a formed in the inner periphery. More specifically, as shown in FIG. 33, the convex parts 35a are formed so that the length L5bi in the circumferential direction of the convex parts 35a in the outer periphery is longer than the length L5ai in the circumferential direction of the convex parts 35a in the inner periphery, for example. Accordingly, the convex parts 35a formed inside the burst pattern forming regions Abs should preferably be formed so that the height of the parts corresponding to the convex parts 35a in the outer periphery of the stamper 20B is higher than the height of the parts corresponding to the convex parts 35a in the inner periphery. By doing so, during imprinting, the convex parts 35a on the stamper 20B that form the burst patterns can be pressed into the resin layer 14 to a sufficient depth and to a similar extent across the entire burst pattern forming regions Abs. Note that as shown in FIG. 33, the expression "formed continuously in the radial direction" for the present invention is not limited to a state where parts are formed continuously along a direction perpendicular to the circumferential direction (i.e., along a direction perpendicular to the direction of the arrow R) and includes a state where parts are formed continuously along a direction that intersects the radial direction at an acute angle.

Figure 34:
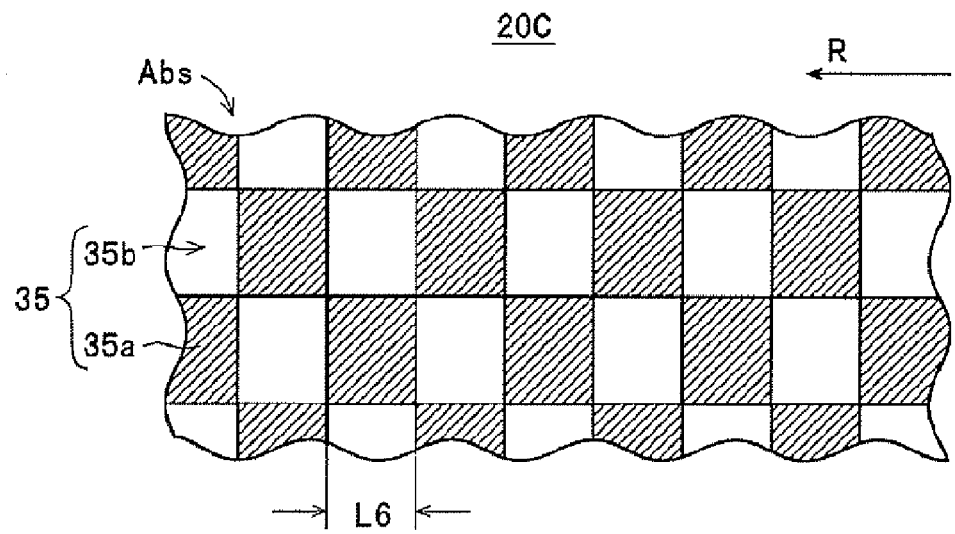
FIG. 34 is a plan view of a burst pattern forming region inside a servo pattern forming region of yet another stamper.
Figure 35:
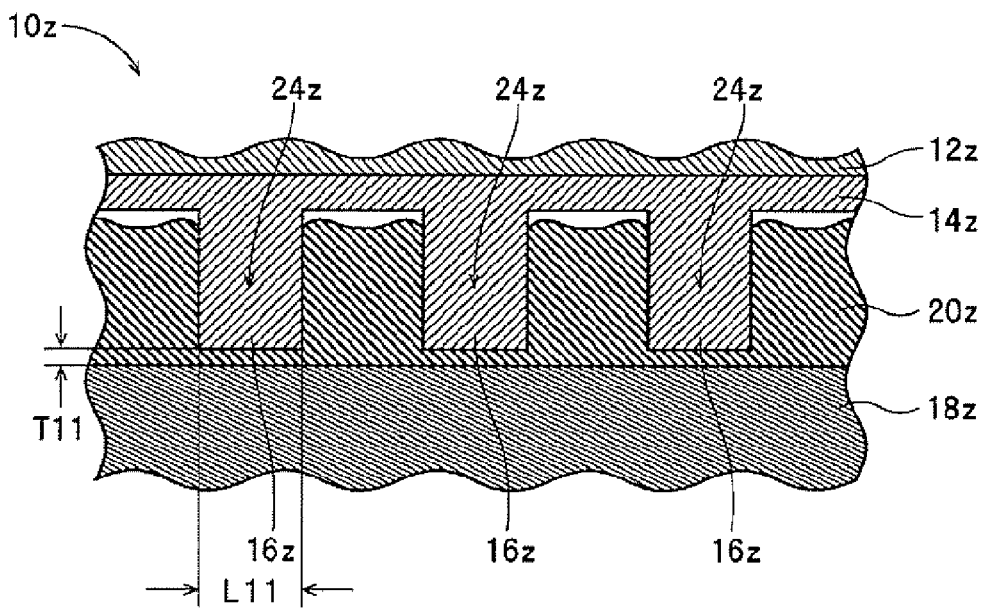
FIG. 35 is a cross-sectional view of a state where convex parts with short lengths on a conventional stamper have been pressed into a resin layer.
Figure 36:
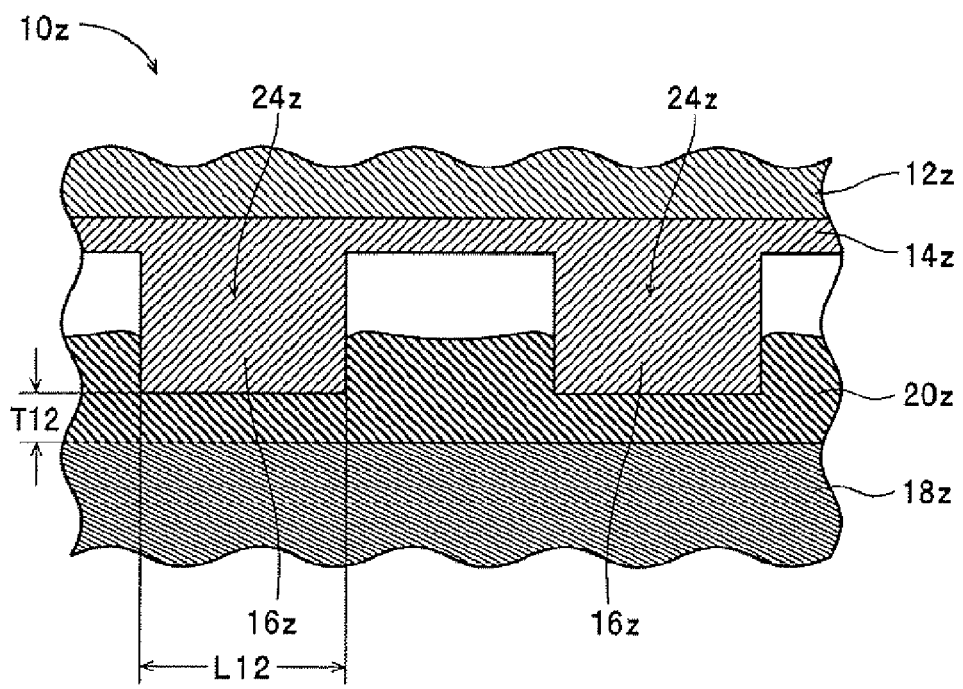
FIG. 36 is a cross-sectional view of a state where convex parts with long lengths on the conventional stamper have been pressed into the resin layer.

In addition, like the stamper 20C shown in FIG. 34, it is possible to use a construction that forms burst patterns in which a plurality of convex parts 35a (a plurality of concave parts 35b) that are parallelogram-shaped are disposed in a checkerboard pattern. Here, the burst pattern forming regions Abs of the stamper 20C are formed so that the length L6 in the circumferential direction of the convex parts 35a for forming the burst patterns gradually increases from the inner periphery to the outer periphery of each burst pattern forming region Abs (so that the length L6 in the circumferential direction of the convex parts 35a in the outer periphery is longer than that of the convex parts 35a in the inner periphery). Accordingly, the height from the reference plane X to the protruding ends should preferably be set higher as the length L6 of the convex parts 35a increases. By doing so, convex parts 35a which have a long length L6 in the circumferential direction and are therefore difficult to press into the resin layer 14 during the imprinting process (i.e., convex parts 35a in the outer periphery) can be pressed into the resin layer 14 sufficiently deeply and to a similar extent as the convex parts 35a which have a short length L6 in the circumferential direction (i.e., convex parts 35a in the inner periphery).

Also, although the stamper 20 is manufactured by the method of manufacturing described above forming the electrode film 21 and the nickel layer 22 so as to cover the concave/convex pattern 34 formed by etching the disk-shaped base plate 25 using the nickel layer 26 (the mask pattern 33) as a mask, the method of manufacturing the stamper according to the present invention is not limited to this. As one example, it is also possible to manufacture the stamper 20 by forming the resist layer 27 on the disk-shaped base plate 25, forming a concave/convex pattern (not shown) by forming concave parts with different depths in the resist layer 27, and then forming the electrode film 21 and the nickel layer 22 so as to cover the concave/convex pattern. In addition, it is also possible to manufacture the stamper according to the present invention by using a stamper manufactured by transferring the concave/convex form of the stamper 20 described above to a stamper forming material as a master stamper and transferring the concave/convex form of the master stamper to another stamper forming material, or in other words, by transferring the concave/convex form of the stamper 20 described above an even number of times.

In addition, although a heating process is continuously carried out on both the preform 10 and the stamper 20 from before the start of the process that presses the stamper 20 onto the preform 10 until the process that separates the stamper 20 is completed in the imprinting method that uses the imprinting apparatus 100 described above (i.e., in the method of manufacturing the information recording medium 1), the present invention is not limited to this and it is possible to use a process that stops the heating process for the preform 10 and the stamper 20 after the stamper 20 has been sufficiently pressed onto the preform 10, and separates the stamper 20 afterward. In addition, it is possible to cool both the stamper 20 and the preform 10 to the glass transition point of the resin layer 14 or below before the stamper 20 is separated. It is also possible to use a method that forms the resin layer for the present invention using a resin material whose glass transition point is lower than room temperature (as one example, around 25° C.) and forms concave/convex patterns in the resin layer without carrying out a heating process or a cooling process from the stamper pressing process to the stamper separating process. In addition, it is possible to use a method that forms a concave/convex pattern in a resin layer by forming the resin layer using a UV-curing resin or an electron-beam curing resin as the "resin material" for the present invention, and irradiating the resin layer with UV rays or an electron beam after the stamper pressing process to harden (or semi-harden) the resin layer, and then carries out the stamper separating process.

Concave/convex patterns formed by the imprinting method according to the present invention are not limited to being applied to manufacturing discrete-track type information recording media and can be used when manufacturing a patterned medium with patterns aside from track-type patterns and/or when manufacturing a magnetic recording medium where the data track pattern regions are composed of continuous magnetic layers. In addition, it is possible to use the imprinting method to manufacture various types of information recording media aside from magnetic recording media, such as optical recording media and magneto-optical recording media.

What is claimed is:

1. A stamper on which stamper-side concave/convex patterns are formed and which is capable of manufacturing an information recording medium on which at least servo patterns are formed by concave/convex patterns,
    wherein first convex parts that are continuously formed along a direction corresponding to a radial direction of the information recording medium are formed in the stamper-side concave/convex patterns, and
    each of the first convex parts is formed so that a height of a part of the first convex part from a reference plane, which is set between a front surface and a rear surface of the stamper, to protruding end of the first convex part increases as a length of the part of the first convex part in a direction corresponding to a circumferential direction of the information recording medium increases.

2. A stamper on which stamper-side concave/convex patterns are formed and which is capable of manufacturing an information recording medium on which at least servo patterns are formed by concave/convex patterns,
    wherein a plurality of first convex parts that are continuously formed along a direction corresponding to a radial direction of the information recording medium are formed in the stamper-side concave/convex patterns, and
    at positions with an equal radius from a center of the stamper, the first convex parts are formed so that a height thereof from a reference plane, which is set between a front surface and a rear surface of the stamper, to protruding ends of the first convex parts increases as a length of the first convex parts in a direction corresponding to a circumferential direction of the information recording medium increases.

3. A stamper according to claim 1, wherein the stamper-side concave/convex patterns are formed so as to be capable of manufacturing an information recording medium on which data track patterns and the servo patterns are formed by concave/convex patterns, and
    the first convex parts are formed so that at positions where a length of the first convex parts in the direction corresponding to the circumferential direction is longer than a length in the direction corresponding to the radial direction of a second convex part that has the highest height out of convex parts formed in regions corresponding to the data track patterns, the height of the first convex parts is higher than the height of the second convex part.

4. A stamper according to claim 2, wherein the stamper-side concave/convex patterns are formed so as to be capable of manufacturing an information recording medium on which data track patterns and the servo patterns are formed by concave/convex patterns, and
    the first convex parts are formed so that at positions where a length of the first convex parts in the direction corresponding to the circumferential direction is longer than a length in the direction corresponding to the radial direction of a second convex part that has the highest height out of convex parts formed in regions corresponding to the data track patterns, the height of the first convex parts is higher than the height of the second convex part.

5. A stamper on which stamper-side concave/convex patterns are formed and which is capable of manufacturing an information recording medium on which at least servo patterns are formed by concave/convex patterns,
    wherein in the stamper-side concave/convex patterns, parts corresponding to individual burst regions in burst patterns out of the servo patterns are composed of concave parts and third convex parts are formed around the concave parts, and
    between the concave parts, each of the third convex parts is formed so that a height of a part of the third convex part from a reference plane, which is set between a front surface and a rear surface of the stamper, to protruding end of the third convex part increases as a length of the part of the third convex part in a direction corresponding to a circumferential direction of the information recording medium increases.

6. A stamper on which stamper-side concave/convex patterns are formed and which is capable of manufacturing an information recording medium on which at least servo patterns are formed by concave/convex patterns,
    wherein in the stamper-side concave/convex patterns, parts corresponding to individual burst regions in burst patterns out of the servo patterns are composed of fourth convex parts, and
    the fourth convex parts are formed so that a height thereof from a reference plane, which is set between a front surface and a rear surface of the stamper, to protruding ends of the fourth convex parts increases as a length of the fourth convex parts in a direction corresponding to a circumferential direction of the information recording medium increases.

7. An imprinting method comprising:
    a stamper pressing process, which presses the stamper-side concave/convex patterns of a stamper according to claim 1 onto a resin layer formed by applying a resin material onto a surface of a substrate; and
    a stamper separating process, which separates the stamper from the resin layer, wherein the stamper pressing process and stamper separating process are carried out in the mentioned order to transfer a concave/convex form of the stamper-side concave/convex patterns to the resin layer.

8. An imprinting method comprising:
    a stamper pressing process, which presses the stamper-side concave/convex patterns of a stamper according to claim 2 onto a resin layer formed by applying a resin material onto a surface of a substrate; and
    a stamper separating process, which separates the stamper from the resin layer, wherein the stamper pressing process and stamper separating process are carried out in the mentioned order to transfer a concave/convex form of the stamper-side concave/convex patterns to the resin layer.

9. An imprinting method comprising:
a stamper pressing process, which presses the stamper-side concave/convex patterns of a stamper according to claim 5 onto a resin layer formed by applying a resin material onto a surface of a substrate; and
a stamper separating process, which separates the stamper from the resin layer, wherein the stamper pressing process and stamper separating process are carried out in the mentioned order to transfer a concave/convex form of the stamper-side concave/convex patterns to the resin layer.

10. An imprinting method comprising:
a stamper pressing process, which presses the stamper-side concave/convex patterns of a stamper according to claim 6 onto a resin layer formed by applying a resin material onto a surface of a substrate; and
a stamper separating process, which separates the stamper from the resin layer, wherein the stamper pressing process and stamper separating process are carried out in the mentioned order to transfer a concave/convex form of the stamper-side concave/convex patterns to the resin layer.

11. A method of manufacturing an information recording medium using a concave/convex pattern transferred to the resin layer by the imprinting method according to claim 7.

12. A method of manufacturing an information recording medium using a concave/convex pattern transferred to the resin layer by the imprinting method according to claim 8.

13. A method of manufacturing an information recording medium using a concave/convex pattern transferred to the resin layer by the imprinting method according to claim 9.

14. A method of manufacturing an information recording medium using a concave/convex pattern transferred to the resin layer by the imprinting method according to claim 10.

* * * * *